(12) United States Patent
Hu et al.

(10) Patent No.: US 12,328,260 B2
(45) Date of Patent: Jun. 10, 2025

(54) METHOD FOR FORWARDING PACKET IN SR NETWORK, DEVICE, AND SYSTEM

(71) Applicant: HUAWEI TECHNOLOGIES CO., LTD., Guangdong (CN)

(72) Inventors: Zhibo Hu, Beijing (CN); Cheng Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 369 days.

(21) Appl. No.: 17/681,137

(22) Filed: Feb. 25, 2022

(65) Prior Publication Data

US 2022/0182323 A1   Jun. 9, 2022

Related U.S. Application Data

(63) Continuation of application No. PCT/CN2020/088788, filed on May 6, 2020.

(30) Foreign Application Priority Data

Aug. 31, 2019   (CN) ......................... 201910819877.6
Dec. 19, 2019   (CN) ......................... 201911317222.5

(51) Int. Cl.
  *H04L 45/748*   (2022.01)
  *H04L 45/50*   (2022.01)
  *H04L 69/22*   (2022.01)

(52) U.S. Cl.
  CPC ............ *H04L 45/748* (2013.01); *H04L 45/50* (2013.01); *H04L 69/22* (2013.01)

(58) Field of Classification Search
  None
  See application file for complete search history.

(56) References Cited

U.S. PATENT DOCUMENTS

2014/0369356 A1   12/2014   Bryant et al.
2017/0250908 A1*   8/2017   Nainar ................. H04L 45/04
(Continued)

FOREIGN PATENT DOCUMENTS

CN   108429685 A   8/2018
CN   109688057 A   4/2019
(Continued)

OTHER PUBLICATIONS

Bonica R. "The IPv6 Compressed Routing Header (CRH)" draft-bonica-6man-comp-rtg-hdr-05 Jul. 5, 2019 (Year: 2019).*
(Continued)

*Primary Examiner* — Robert M Morlan

(57) ABSTRACT

A method for forwarding a packet including: receiving a first packet, where a first packet header of the first packet includes a segment list used to forward the first packet, the segment list includes a plurality of sequentially arranged identifiers, each of the plurality of identifiers corresponds to one network device or one link, the list includes a first element whose length is 128 bits, the first element includes at least two adjacent identifiers in the plurality of identifiers, and the first packet includes a first pointer; determining a location of a first identifier in the first element based on a value of the first pointer, where the first identifier is one of the at least two identifiers; copying at least one identifier starting from the first identifier to a second packet header of the first packet, to generate a second packet; and sending the second packet.

29 Claims, 20 Drawing Sheets

(56) References Cited

U.S. PATENT DOCUMENTS

| | | | |
|---|---|---|---|
| 2018/0034727 A1 | 2/2018 | Nainar et al. | |
| 2019/0081897 A1 | 3/2019 | Shakir et al. | |
| 2020/0389401 A1* | 12/2020 | Enguehard | H04L 45/745 |

FOREIGN PATENT DOCUMENTS

| | | |
|---|---|---|
| CN | 109981457 A | 7/2019 |
| JP | 2019505140 A | 2/2019 |
| WO | 2019005949 A1 | 1/2019 |

OTHER PUBLICATIONS

Deering, S. "Internet Protocol, Version 6 (IPv6) Specification" RFC 8200, Jul. 2017 (Year: 2017).*

C. Filsfils, Ed. et al., IPv6 Segment Routing Header (SRH), draft-ietf-6man-segment-routing-header-21, Network Working Group Internet-Draft, Jun. 13, 2019, total 37 pages.

C. Filsfils, Ed. et al., Network Programming extension: SRv6 uSID instruction, draft-filsfils-spring-net-pgm-extension-srv6-usid-02, Spring Internet-Draft, Aug. 28, 2019, total 16 pages.

C. Filsfils et al., Segment Routing Architecture, Request for Comments: 8402, Jul. 2018, URL> https://www.ietf.org/rfc/rfc8402.html.

Noction, Segment Routing and the SRv6 Network Programming, Feb. 13, 2018, URL> https://www.noction.com/blog/segment-routing-srv6-network-programming.

R. Bonica et al., The IPV6 Compressed Routing Header (CRH), draft-bonica-6man-comp-rtg-hdr-03, Mar. 23, 2019, URL> https://datatracker.ietf.org/doc/html/draft-bonica-6man-comp-rtg-hdr-03#appendix-A.

Z.Li et al:"Compressed SRv6 Network Programming draft-li-spring-compressed-srv6-np-00." Jul. 22, 2019. total 15 pages.

Zhang Guiyu:"Discussion on the Application of Segment Routing in SDN", (Sep. 30, 2016), total 4 pages.

W. Cheng et al:"Path Segment in MPLS Based Segment Routing Network draft-ietf-spring-mpls-path-segment-00", Mar. 8, 2019, total 9 pages.

* cited by examiner

| |
|---|
| BLOCK |
| uSID 10 |
| Padding |
| SID 9 |
| uSID 5 |
| uSID 6 |
| uSID 7 |
| uSID 8 |
| uSID 1 |
| uSID 2 |
| uSID 3 |
| uSID 4 |

FIG. 6

| |
|---|
| BLOCK |
| uSID 9 |
| uSID 10 |
| Padding |
| uSID 5 |
| uSID 6 |
| uSID 7 |
| uSID 8 |
| uSID 1 |
| uSID 2 |
| uSID 3 |
| uSID 4 |

FIG. 7

| BLOCK |
|---|
| uSID 10 |
| Padding |
| SID 9 |
| M5 |
| M6 |
| uSID 7 |
| uSID 8 |
| uSID 1 |
| uSID 2 |
| M3 |
| M4 |

FIG. 8

| 0 | 15 | 31 |
|---|---|---|
| Version (Version) | Traffic class (Traffic Class) | Flow label (Flow Label) |
| Payload length (Payload Length) | Type of a next packet header (Next Header) | Hop limit (Hop Limit) |
| Source address (Source Address) ||| 
| BLOCK |||
| uSID 1 |||
| uSID 2 |||
| uSID 3 |||
| Type of a next packet header (Next Header) | SRH length (Hdr Ext Len) | Routing type (Routing Type) | Segment left (Segment Left) |
| Index of the last element (Last Entry) | Flags (Flags) in a data packet | Data packets in a same group (Tag) ||
| BLOCK |||
| uSID 10 |||
| Padding |||
| SID 9 |||
| uSID 5 |||
| uSID 6 |||
| uSID 7 |||
| uSID 8 |||
| uSID 1 |||
| uSID 2 |||
| uSID 3 |||
| uSID 4 |||
| Optional TLV (Optional TLV objects (variable)) |||
| IPv6 payload (IPv6 Payload) |||

FIG. 9

| 0 | | 15 | | 31 |
|---|---|---|---|---|
| Version (Version) | Traffic class (Traffic Class) | Flow label (Flow Label) | | |
| Payload length (Payload Length) | | Type of a next packet header (Next Header) | | Hop limit (Hop Limit) |
| Source address (Source Address) | | | | |
| BLOCK | | | | |
| uSID 1 | | | | |
| uSID 2 | | | | |
| M3 | | | | |
| Type of a next packet header (Next Header) | SRH length (Hdr Ext Len) | Routing type (Routing Type) | | Segment left (Segment Left) |
| Index of the last element (Last Entry) | Flags (Flags) in a data packet | Data packets in a same group (Tag) | | |
| BLOCK | | | | |
| uSID 10 | | | | |
| Padding | | | | |
| SID 9 | | | | |
| M5 | | | | |
| M6 | | | | |
| uSID 7 | | | | |
| uSID 8 | | | | |
| uSID 1 | | | | |
| uSID 2 | | | | |
| M3 | | | | |
| M4 | | | | |
| Optional TLV (Optional TLV objects (variable)) | | | | |
| IPv6 payload (IPv6 Payload) | | | | |

FIG. 10

| 0 | | 15 | | 31 |
|---|---|---|---|---|
| Version (Version) | Traffic class (Traffic Class) | Flow label (Flow Label) | | |
| Payload length (Payload Length) | | Type of a next packet header (Next Header) | | Hop limit (Hop Limit) |
| Source address (Source Address) | | | | |
| BLOCK | | | | |
| uSID 2 | | | | |
| uSID 3 | | | | |
| Padding | | | | |
| Type of a next packet header (Next Header) | SRH length (Hdr Ext Len) | Routing type (Routing Type) | | Segment left (Segment Left) |
| Index of the last element (Last Entry) | Flags (Flags) in a data packet | Data packets in a same group (Tag) | | |
| BLOCK | | | | |
| uSID 10 | | | | |
| Padding | | | | |
| SID 9 | | | | |
| uSID 5 | | | | |
| uSID 6 | | | | |
| uSID 7 | | | | |
| uSID 8 | | | | |
| uSID 1 | | | | |
| uSID 2 | | | | |
| uSID 3 | | | | |
| uSID 4 | | | | |
| Optional TLV (Optional TLV objects (variable)) | | | | |
| IPv6 payload (IPv6 Payload) | | | | |

FIG. 11

| 0 | | 15 | 31 |
|---|---|---|---|
| Version (Version) | Traffic class (Traffic Class) | Flow label (Flow Label) ||
| Payload length (Payload Length) || Type of a next packet header (Next Header) | Hop limit (Hop Limit) |
| Source address (Source Address) ||||
| BLOCK ||||
| uSID 3 ||||
| Padding ||||
| Type of a next packet header (Next Header) | SRH length (Hdr Ext Len) | Routing type (Routing Type) | Segment left (Segment Left) |
| Index of the last element (Last Entry) | Flags (Flags) in a data packet | Data packets in a same group (Tag) ||
| BLOCK ||||
| uSID 10 ||||
| Padding ||||
| SID 9 ||||
| uSID 5 ||||
| uSID 6 ||||
| uSID 7 ||||
| uSID 8 ||||
| uSID 1 ||||
| uSID 2 ||||
| uSID 3 ||||
| uSID 4 ||||
| Optional TLV (Optional TLV objects (variable)) ||||
| IPv6 payload (IPv6 Payload) ||||

FIG. 12

| 0 | | 15 | | 31 |
|---|---|---|---|---|
| Version (Version) | Traffic class (Traffic Class) | Flow label (Flow Label) | | |
| Payload length (Payload Length) | | Type of a next packet header (Next Header) | | Hop limit (Hop Limit) |
| Source address (Source Address) | | | | |
| BLOCK | | | | |
| uSID 2 | | | | |
| M3 | | | | |
| Padding | | | | |
| Type of a next packet header (Next Header) | SRH length (Hdr Ext Len) | Routing type (Routing Type) | | Segment left (Segment Left) |
| Index of the last element (Last Entry) | Flags (Flags) in a data packet | Data packets in a same group (Tag) | | |
| BLOCK | | | | |
| uSID 10 | | | | |
| Padding | | | | |
| SID 9 | | | | |
| M5 | | | | |
| M6 | | | | |
| uSID 7 | | | | |
| uSID 8 | | | | |
| uSID 1 | | | | |
| uSID 2 | | | | |
| M3 | | | | |
| M4 | | | | |
| Optional TLV (Optional TLV objects (variable)) | | | | |
| IPv6 payload (IPv6 Payload) | | | | |

FIG. 13

| 0 | | 15 | | 31 |
|---|---|---|---|---|
| Version (Version) | Traffic class (Traffic Class) | Flow label (Flow Label) | | |
| Payload length (Payload Length) | | Type of a next packet header (Next Header) | | Hop limit (Hop Limit) |
| Source address (Source Address) | | | | |
| BLOCK | | | | |
| uSID 4 | | | | |
| Padding | | | | |
| Type of a next packet header (Next Header) | SRH length (Hdr Ext Len) | Routing type (Routing Type) | | Segment left (Segment Left) |
| Index of the last element (Last Entry) | Flags (Flags) in a data packet | Data packets in a same group (Tag) | | |
| BLOCK | | | | |
| uSID 10 | | | | |
| Padding | | | | |
| SID 9 | | | | |
| uSID 5 | | | | |
| uSID 6 | | | | |
| uSID 7 | | | | |
| uSID 8 | | | | |
| uSID 1 | | | | |
| uSID 2 | | | | |
| uSID 3 | | | | |
| uSID 4 | | | | |
| Optional TLV (Optional TLV objects (variable)) | | | | |
| IPv6 payload (IPv6 Payload) | | | | |

FIG. 14

| 0 | | 15 | | 31 |
|---|---|---|---|---|
| Version (Version) | Traffic class (Traffic Class) | Flow label (Flow Label) | | |
| Payload length (Payload Length) | | Type of a next packet header (Next Header) | | Hop limit (Hop Limit) |
| Source address (Source Address) | | | | |
| BLOCK | | | | |
| uSID 5 | | | | |
| uSID 6 | | | | |
| uSID 7 | | | | |
| Type of a next packet header (Next Header) | SRH length (Hdr Ext Len) | Routing type (Routing Type) | | Segment left (Segment Left) |
| Index of the last element (Last Entry) | Flags (Flags) in a data packet | Data packets in a same group (Tag) | | |
| BLOCK | | | | |
| uSID 10 | | | | |
| Padding | | | | |
| SID 9 | | | | |
| uSID 5 | | | | |
| uSID 6 | | | | |
| uSID 7 | | | | |
| uSID 8 | | | | |
| uSID 1 | | | | |
| uSID 2 | | | | |
| uSID 3 | | | | |
| uSID 4 | | | | |
| Optional TLV (Optional TLV objects (variable)) | | | | |
| IPv6 payload (IPv6 Payload) | | | | |

FIG. 15

| 0 | | 15 | 31 |
|---|---|---|---|
| Version (Version) | Traffic class (Traffic Class) | Flow label (Flow Label) ||
| Payload length (Payload Length) || Type of a next packet header (Next Header) | Hop limit (Hop Limit) |
| Source address (Source Address) ||||
| SID 9 ||||
| Type of a next packet header (Next Header) | SRH length (Hdr Ext Len) | Routing type (Routing Type) | Segment left (Segment Left) |
| Index of the last element (Last Entry) | Flags (Flags) in a data packet | Data packets in a same group (Tag) ||
| BLOCK ||||
| uSID 10 ||||
| Padding ||||
| SID 9 ||||
| uSID 5 ||||
| uSID 6 ||||
| uSID 7 ||||
| uSID 8 ||||
| uSID 1 ||||
| uSID 2 ||||
| uSID 3 ||||
| uSID 4 ||||
| Optional TLV (Optional TLV objects (variable)) ||||
| IPv6 payload (IPv6 Payload) ||||

FIG. 16

METHOD FOR FORWARDING PACKET IN SR NETWORK, DEVICE, AND SYSTEM

CROSS-REFERENCE TO RELATED APPLICATIONS

This application is a continuation of International Application No. PCT/CN2020/088788, filed on May 6, 2020, which claims priority to Chinese Patent Application No. 201911317222.5, filed on Dec. 19, 2019 and Chinese Patent Application No. 201910819877.6, filed on Aug. 31, 2019. All of the aforementioned patent applications are hereby incorporated by reference in their entireties.

TECHNICAL FIELD

This disclosure relates to the communications field, and in particular, to a method for forwarding a packet in a segment routing (SR) network, a network device, and a system.

BACKGROUND

SR is a protocol designed based on a source routing concept to forward a data packet on a network. The SR supports explicitly specifying a data packet forwarding path on a source node. When being deployed on an internet protocol version 6 (IPv6) data plane, the SR is referred to as IPv6 segment routing (SRv6). When being deployed on a multi-protocol label switch (MPLS) data plane, the SR is referred to as SR-MPLS. The SRv6 defines a segment routing header (SRH), which is an extension to an IPv6 header.

The SRH includes a segment list, the segment list includes a plurality of sequentially arranged segment identifiers (SID), and each SID corresponds to one node or link on a forwarding path of a packet. The SRH is encapsulated in the packet, and the segment list in the SRH is used to bear forwarding and processing processes of the packet in an SR network. Each SID is a 128-bit IPv6 address. Each SID occupies 128 bits in the packet. Therefore, each time an SID is added to the segment list, a length of the SRH increases by 128 bits, and correspondingly, a length of the packet increases by 128 bits. A large quantity of network resources such as bandwidth are occupied in a forwarding process because the length of the packet increases. For example, when the forwarding path of the packet includes 100 nodes, the SRH includes 100 SIDs, and a length of the segment list is up to 1600 bytes. Therefore, packet transmission efficiency in the SR network is reduced because the segment list is excessively long.

SUMMARY

This disclosure provides a method for forwarding a packet, a device, and a system, to resolve a technical problem that packet transmission efficiency in an SR network is reduced because a segment list is excessively long.

According to a first aspect, a method for forwarding a packet is provided. The method includes: receiving a first packet, where a first packet header of the first packet includes a segment list used to forward the first packet, the segment list includes a plurality of sequentially arranged identifiers, each of the plurality of identifiers corresponds to one network device or one link, the segment list includes a first element whose length is 128 bits, the first element includes at least two adjacent identifiers in the plurality of identifiers, and the first packet includes a first pointer; determining a location of the first identifier in the first element based on a value of the first pointer, where the first identifier is one of the at least two identifiers; copying at least one identifier starting from the first identifier to a second packet header of the first packet, to generate a second packet; and sending the second packet.

The method may be performed by an intermediate node on a forwarding path of a packet. The segment list may be a segment list in an SRH of an SRv6 packet. At least two identifiers corresponding to the network device can be stored in an element whose length is 128 bits in the segment list, and each identifier does not need to occupy 128 bits. Therefore, a length of the segment list is reduced, a length of the packet is reduced, and packet transmission efficiency is improved. A quantity of identifiers stored in each 128-bit element may be adjusted based on an actual network status. When one 128-bit element includes a plurality of identifiers, these identifiers may be understood as compressed segment identifiers (or referred to as a micro segment ID, uSID). A location of the compressed segment identifier in the element can be accurately and quickly obtained by using the first pointer included in the packet header.

In an optional implementation, the plurality of identifiers are mapped to a plurality of segment identifiers in a one-to-one manner, each of the plurality of segment identifiers corresponds to one network device or one link, each of the plurality of segment identifiers includes a first part and a second part, the first part in each of the plurality of segment identifiers is the prefix part, prefix parts in the plurality of segment identifiers are the same, and each of the plurality of identifiers includes a second part in a segment identifier to which the identifier is mapped. The uSID may be obtained by omitting a part of content in the SID. In a domain, BLOCK parts in SIDs of all network devices are the same. Therefore, the uSID may be obtained by omitting the BLOCK part in the SID, and the uSID is placed in the segment list, to reduce a length of the segment list.

In an optional implementation, the second packet header includes a destination address (DA) field, and the destination address field includes a first part and a second part. The copying at least one identifier starting from the first identifier to a second packet header of the first packet includes: copying the at least one identifier starting from the first identifier to the second part in the destination address field. The first identifier is an identifier to be added to the DA field, and may also be referred to as a to-be-added identifier. In addition, the first identifier may be a uSID. When an element in the segment list includes a plurality of identifiers, the network device determines the first identifier from the plurality of identifiers based on the first pointer, and copies the at least one identifier starting from the first identifier to the DA field, where the prefix part in the SID is also directly placed in the DA field, so that the prefix part in the SID and the at least one identifier starting from the first identifier are combined to guide packet forwarding.

In an optional implementation, lengths of the plurality of identifiers are the same. Before the copying at least one identifier starting from the first identifier to a second packet header of the first packet, the method further includes: determining a quantity of the at least one identifier based on the lengths of the plurality of identifiers and a length of the prefix part. In the DA field, one part is occupied by a prefix part, and the other part is occupied by at least one uSID that is copied to the DA field. The network device may determine, based on a length of the uSID and a length of the prefix part, a quantity of the at least one uSID that can be copied to the DA field.

In an optional implementation, the segment list does not include the prefix part. When adding an SRH to a packet, a head node also stores a currently to-be-processed uSID and a BLOCK part corresponding to the uSID in the DA field. A uSID adjacent to the BLOCK part in the DA field may be referred to as an active uSID. Therefore, for the active uSID and another uSID corresponding to a same prefix part as the active uSID, the segment list may not store prefix parts corresponding to these uSIDs, but stores only these uSIDs, to reduce a length of the segment list.

In an optional implementation, the first packet includes a destination address field, the destination address field includes a second identifier, and the second identifier is one of the plurality of identifiers. Before the determining a location of the first identifier in the first element based on a value of the first pointer, the method further includes: determining, based on a switching flag in the second identifier, that the segment list includes an identifier whose type is different from a type of the second identifier; and the copying at least one identifier starting from the first identifier to a second packet header of the first packet includes: copying the at least one identifier to the second packet header to form a forwarding identifier stack, where a type of the at least one identifier is different from the type of the second identifier. The segment list may further include an identifier of another type, for example, an MPLS label or an internet protocol version 4 (IPv4) address. The network device establishes the forwarding identifier stack in a packet header, and copies the identifier of another type to the forwarding identifier stack. Therefore, the method can be compatible with more network scenarios, and an entire forwarding path is programmed by using the segment list, thereby improving forwarding efficiency.

In an optional implementation, the first packet includes a quantity flag. Before the copying at least one identifier starting from the first identifier to a second packet header of the first packet, the method further includes: determining a quantity of the at least one identifier based on a value of the quantity flag. The at least one identifier is an identifier of another type, for example, an MPLS label or an IPv4 address. Before copying the identifier of another type to the forwarding identifier stack, the network device may first determine a quantity of the identifier of another type based on the quantity flag, to copy the corresponding quantity of the identifier of another type to the forwarding identifier stack.

In an optional implementation, the determining a location of the first identifier in the first element based on a value of the first pointer includes: determining a quantity of redundant identifiers in the destination address field, where a type of the redundant identifier is different from the type of the second identifier; correcting the value of the first pointer based on the quantity of redundant identifiers; and determining the location of the first identifier in the first element based on the corrected value of the first pointer. The first identifier is the $1^{st}$ identifier in at least one identifier of another type, and the redundant identifier is an identifier of another type that has been added to the DA field. The network device corrects the value of the first pointer based on a quantity of the identifier of another type that has been added to the DA field, and determines, based on the corrected value of the first pointer, a start location of at least one identifier that is in the segment list and that is to be added to the DA field.

In an optional implementation, the copying the at least one identifier starting from the first identifier to a forwarding identifier stack includes: adding a next identifier of the last identifier in the at least one identifier to the destination address field in the first packet. The network device further copies a compressed segment identifier following the identifier of another type in the segment list to the DA field, so that the network device continues to forward a packet based on the DA field after the forwarding identifier stack is popped up.

In an optional implementation, the at least one identifier is an MPLS label or an IPv4 address. The identifier of another type may be an MPLS label or an IPv4 address.

In an optional implementation, the first pointer is included in the first packet header. The first pointer may be in a specific field in the SRH, or may be in the segment list.

In an optional implementation, after the copying at least one identifier starting from the first identifier to a second packet header of the first packet, the method further includes: modifying the value of the first pointer, so that the modified value of the first pointer is used to indicate a location of the second identifier in the first element, where the second identifier does not belong to the at least one identifier. The network device modifies the value of the first pointer, so that the value of the first pointer always points to a to-be-added identifier, and therefore the network device on the forwarding path can subsequently continue to determine the to-be-added identifier based on the value of the first pointer.

In an optional implementation, after the copying at least one identifier starting from the first identifier to a second packet header of the first packet, the method further includes: modifying the value of the first pointer, so that the modified value of the first pointer is used to indicate a location of the second identifier in a second element, where the second identifier does not belong to the at least one identifier, and the second element is different from the first element. After processing an identifier in a current element, the network device may point the first pointer to an identifier in a next element. For example, the network device resets the value of the first pointer to 0, to point to a start location of the next element.

According to a second aspect, a method for forwarding a packet is provided. The method includes: receiving a first packet; obtaining a segment list, where the segment list corresponds to a forwarding path of the first packet, the forwarding path includes a plurality of network devices, the segment list includes a plurality of sequentially arranged identifiers, each of the plurality of identifiers corresponds to one of the plurality of network devices or one link on the forwarding path, the segment list includes a first element whose length is 128 bits, and the first element includes at least two adjacent identifiers in the plurality of identifiers; adding the segment list to the first packet to generate a second packet, where the second packet includes a first pointer, a value of the first pointer is used to indicate a location of a first identifier in the first element, and the first identifier is one of the at least two identifiers; and sending the second packet.

The method may be performed by an ingress node on a forwarding path of a packet.

The segment list may be a segment list in an SRH of an SRv6 packet. At least two identifiers corresponding to the network device can be stored in an element whose length is 128 bits in the segment list, and each identifier does not need to occupy 128 bits. Therefore, a length of the segment list is reduced, a length of the packet is reduced, and packet transmission efficiency is improved. A quantity of identifiers stored in each 128-bit element may be adjusted based on an actual network status. When one 128-bit element includes a plurality of identifiers, the ingress node on the forwarding path of the packet adds a first pointer to a packet header, to indicate locations of different identifiers in the element, so that an intermediate node on the forwarding path of the packet can accurately and quickly obtain the locations of the identifiers in the element.

In an optional implementation, the plurality of identifiers are mapped to a plurality of segment identifiers in a one-to-one manner, each of the plurality of segment identifiers corresponds to one of the plurality of network devices or one link on the forwarding path, each of the plurality of segment identifiers includes a first part and a second part, the first part in each segment identifier is a prefix part, prefix parts in the plurality of segment identifiers are the same, and each of the plurality of identifiers includes a second part in a segment identifier to which the identifier is mapped. A uSID may be obtained by omitting a part of content in the SID. In a domain, BLOCK parts in SIDs of all network devices are the same. Therefore, the uSID may be obtained by omitting the BLOCK part in the SID, and the uSID is placed in the segment list, to reduce a length of the segment list.

In an optional implementation, a packet header of the first packet includes a destination address field, and the destination address field includes a first part and a second part. The adding the segment list to the first packet to generate a second packet includes: adding the prefix part to the first part in the destination address field; and adding one or more of the plurality of identifiers to the second part in the destination address field. Because the prefix part in the SID is omitted in the uSID in the segment list, the ingress node on the forwarding path directly adds the prefix part to the DA field, and further adds the $1^{st}$ identifier in the segment list to the DA field, so that the prefix part in the SID and the first identifier are combined to guide packet forwarding.

In an optional implementation, the segment list does not include the prefix part. The prefix part in the SID is stored in the DA field. The segment list stores only the uSID, but does not store the prefix part in the SID, to reduce a length of the segment list.

In an optional implementation, at least one of the plurality of identifiers is an MPLS label or an IPv4 address.

In an optional implementation, the second packet includes a quantity flag, and a value of the quantity flag is used to indicate a quantity of the at least one identifier. The segment list may further include an identifier of another type. In this case, the ingress node on the forwarding path adds the quantity flag to the packet, to indicate a quantity of the identifier of another type.

In an optional implementation, the first pointer is located in a packet header of the second packet. The first pointer may be in a specific field in the SRH, or may be in the segment list.

In an optional implementation, the second packet further includes a second pointer, and a value of the second pointer is used to indicate a location of the first element in the segment list. The second pointer may be a segment left (SL) pointer.

In an optional implementation, the obtaining a segment list includes: receiving the segment list. The segment list may be received by the ingress node on the forwarding path from a controller in a network.

In an optional implementation, the obtaining a segment list includes: determining the forwarding path of the first packet, and generating the segment list corresponding to the forwarding path. The segment list may be generated by the ingress node on the forwarding path.

According to a third aspect, a method for generating a segment list used to forward a packet is provided. The method includes: determining a forwarding path of the packet, where the forwarding path includes a plurality of network devices; and generating the segment list corresponding to the forwarding path, where the segment list includes the plurality of sequentially arranged identifiers, each of the plurality of identifiers corresponds to one of the plurality of network devices or one link on the forwarding path, the segment list includes a first element whose length is 128 bits, and the first element includes at least two adjacent identifiers in the plurality of identifiers.

The method may be performed by a network device that generates the segment list. The network device that generates the segment list may be a controller in a network, or may be an ingress node on a forwarding path of a packet in a network. The segment list may be a segment list in an SRH of an SRv6 packet. The network device stores at least two identifiers corresponding to the network device in an element whose length is 128 bits in the segment list, instead of storing only one identifier every 128 bits. Therefore, a length of the segment list is reduced, a length of the packet is reduced, and packet transmission efficiency is improved. A quantity of identifiers stored in each 128-bit element may be adjusted based on an actual network status. When one 128-bit element includes a plurality of identifiers, these identifiers may be understood as compressed segment identifiers (uSID).

In an optional implementation, the plurality of identifiers are mapped to a plurality of segment identifiers in a one-to-one manner, each of the plurality of segment identifiers corresponds to one of the plurality of network devices or one link on the forwarding path, each of the plurality of segment identifiers includes a first part and a second part, the first part in each segment identifier is a prefix part, and each of the plurality of identifiers includes a second part in a segment identifier to which the identifier is mapped. The uSID may be obtained by omitting a part of content in the SID. In a domain, BLOCK parts in SIDs of all network devices are the same. Therefore, the uSID may be obtained by omitting the BLOCK part in the SID, and the uSID is placed in the segment list, to reduce a length of the segment list.

In an optional implementation, the segment identifier in the plurality of segment identifiers further includes a third part, the third part is a padding part, padding parts in the plurality of segment identifiers are the same, and the identifier in the plurality of identifiers does not include the padding part. A function field in the uSID may be a compressed function field, and a length of the compressed function field is less than a length of a non-compressed function field. Therefore, a length of the uSID is less than a length of the SID, and the uSID is placed in the segment list, to reduce a length of the segment list.

In an optional implementation, the plurality of segment identifiers include a first segment identifier, and the segment list does not include a prefix part in the first segment identifier. The plurality of segment identifiers include the first segment identifier, and the segment list does not include the prefix part in the first segment identifier. The segment list stores only the uSID, but does not store the prefix part in the SID, to reduce a length of the segment list.

In an optional implementation, the plurality of segment identifiers further include a second segment identifier, the prefix part in the first segment identifier is different from a prefix part in the second segment identifier, and the segment list includes the prefix part in the second segment identifier. When the plurality of network devices on the forwarding path belong to different network domains, there are at least two types of prefix parts in SIDs of these network devices. In this case, a first type of prefix part is not stored in the segment list, and a second type of prefix part is stored in the segment list. The first type of prefix part is directly placed by the ingress node on the forwarding path in a DA field.

In an optional implementation, at least one of the plurality of identifiers is a segment identifier, an MPLS label, or an IPv4 address.

In an optional implementation, the segment list further includes a quantity flag, and a value of the quantity flag is used to indicate a quantity of the at least one other identifier.

In an optional implementation, after the generating the segment list corresponding to the forwarding path, the method further includes: sending the segment list to an ingress device on the forwarding path; or encapsulating the segment list in the packet, and sending the packet. When the network device that generates the segment list is the controller in the network, the controller generates the segment list and sends the segment list to the ingress node on the forwarding path, so that the ingress node encapsulates the segment list in the packet to guide packet forwarding. When the network device that generates the segment list is the ingress node on the forwarding path of the packet, the ingress node encapsulates the segment list in the packet to guide packet forwarding.

According to a fourth aspect, a network device is provided, and performs the method according to any one of the first aspect or the possible implementations of the first aspect, or any one of the fifteenth aspect or the possible implementations of the fifteenth aspect. Specifically, the network device includes units configured to perform the method according to any one of the first aspect or the possible implementations of the first aspect, or any one of the fifteenth aspect or the possible implementations of the fifteenth aspect.

According to a fifth aspect, a network device is provided, and performs the method according to any one of the second aspect or the possible implementations of the second aspect, or any one of the sixteenth aspect or the possible implementations of the sixteenth aspect. Specifically, the network device includes units configured to perform the method according to any one of the second aspect or the possible implementations of the second aspect, or any one of the sixteenth aspect or the possible implementations of the sixteenth aspect.

According to a sixth aspect, a network device is provided, and performs the method according to any one of the third aspect or the possible implementations of the third aspect. Specifically, the network device includes units configured to perform the method according to any one of the third aspect or the possible implementations of the third aspect.

According to a seventh aspect, a network device is provided. The network device includes a processor, a communications interface, and a memory. The communications interface may be a transceiver. The memory may be configured to store program code, and the processor is configured to invoke the program code in the memory to perform the method according to any one of the first aspect or the possible implementations of the first aspect, or any one of the fifteenth aspect or the possible implementations of the fifteenth aspect. Details are not described herein again.

According to an eighth aspect, a network device is provided. The network device includes a processor, a communications interface, and a memory. The communications interface may be a transceiver. The memory may be configured to store program code, and the processor is configured to invoke the program code in the memory to perform the method according to any one of the second aspect or the possible implementations of the second aspect, or any one of the sixteenth aspect or the possible implementations of the sixteenth aspect. Details are not described herein again.

According to a ninth aspect, a network device is provided. The network device includes a processor, a communications interface, and a memory. The communications interface may be a transceiver. The memory may be configured to store program code, and the processor is configured to invoke the program code in the memory to perform the method according to any one of the third aspect or the possible implementations of the third aspect. Details are not described herein again.

According to a tenth aspect, a network system is provided. The network system includes the network device according to the fourth aspect, the fifth aspect, or the sixth aspect, or the network system includes the network device according to the seventh aspect, the eighth aspect, or the ninth aspect.

According to an eleventh aspect, a computer readable storage medium is provided. The computer readable storage medium stores an instruction, and when the instruction is run on a computer, the computer is enabled to perform the method according to any one of the first aspect or the possible implementations of the first aspect, any one of the second aspect or the possible implementations of the second aspect, any one of the third aspect or the possible implementations of the third aspect, any one of the fifteenth aspect or the possible implementations of the fifteenth aspect, or any one of the sixteenth aspect or the possible implementations of the sixteenth aspect.

According to a twelfth aspect, a computer program product including a computer program instruction is provided. When the computer program product is run on a network device, the network device is enabled to perform the method according to any one of the first aspect or the possible implementations of the first aspect, any one of the second aspect or the possible implementations of the second aspect, any one of the third aspect or the possible implementations of the third aspect, any one of the fifteenth aspect or the possible implementations of the fifteenth aspect, or any one of the sixteenth aspect or the possible implementations of the sixteenth aspect.

According to a thirteenth aspect, a chip is provided, and includes a memory and a processor. The memory is configured to store a computer program, and the processor is configured to: invoke the computer program from the memory and run the computer program, to perform the method according to any one of the first aspect and the possible implementations of the first aspect, the method according to any one of the second aspect or the possible implementations of the second aspect, the method according to any one of the third aspect or the possible implementations of the third aspect, the method according to any one of the fifteenth aspect or the possible implementations of the fifteenth aspect, or the method according to any one of the sixteenth aspect or the possible implementations of the sixteenth aspect.

Optionally, the chip includes only a processor. The processor is configured to: read and execute a computer program stored in a memory, and when the computer program is executed, the processor performs the method according to any one of the first aspect and the possible implementations of the first aspect, the processor performs the method according to any one of the second aspect or the possible implementations of the second aspect, the processor performs the method according to any one of the third aspect or the possible implementations of the third aspect, the processor performs the method according to any one of the fifteenth aspect or the possible implementations of the fifteenth aspect, or the processor performs the method according to any one of the sixteenth aspect or the possible implementations of the sixteenth aspect.

According to a fourteenth aspect, a method for forwarding a packet is provided. The method includes: receiving a first packet, where a first packet header of the first packet includes a segment list used to forward the first packet, the segment list includes a plurality of sequentially arranged identifiers, an identifier in the plurality of identifiers corresponds to one network device or one link, the segment list includes a first element and a second element, a length of the first element and a length of the second element each are 128 bits, and the first element includes at least two adjacent identifiers in the plurality of identifiers; and a second packet header of the first packet includes a destination address field, the destination address field includes a first identifier, and the first identifier is one of the plurality of identifiers; adding the second element to the destination address field according to an indication of the first identifier, to generate a second packet; and sending the second packet.

The method may be performed by an intermediate node on a forwarding path of a packet. The segment list may be a segment list in an SRH of an SRv6 packet. At least two identifiers corresponding to the network device can be stored in an element whose length is 128 bits in the segment list, and each identifier does not need to occupy 128 bits. Therefore, a length of the segment list is reduced, a length of the packet is reduced, and packet transmission efficiency is improved. When one 128-bit element includes a plurality of identifiers, these identifiers may be understood as compressed segment identifiers (uSID). The segment list may further store a segment identifier (SID) whose length is 128 bits. In other words, both the SID and the uSID are stored in the segment list. When being added to the DA field, the SID and the uSID correspond to different adding manners. Therefore, a switching flag needs to be set between the uSID and the SID. The network device may obtain the switching flag from the DA field, and use a corresponding adding manner according to an indication of the switching flag. For example, when adding the SID to the DA field, the network device adds an entire element whose length is 128 bits in the segment list to the DA field, to ensure packet forwarding.

According to a fifteenth aspect, a method for forwarding a packet is provided. The method includes: receiving a first packet, where a first packet header of the first packet includes a segment list used to forward the first packet, the segment list includes a plurality of sequentially arranged identifiers, each of the plurality of identifiers corresponds to one network device or one link, the segment list includes a first element whose length is 128 bits, the first element includes at least two adjacent identifiers in the plurality of identifiers, and the first packet includes a first pointer; determining a location of a first identifier in the segment list based on a value of the first pointer, where the first identifier is one of the at least two identifiers; copying at least one identifier starting from the first identifier to a second packet header of the first packet, to generate a second packet; and sending the second packet.

The method may be performed by an intermediate node on a forwarding path of a packet. The segment list may be a segment list in an SRH of an SRv6 packet. At least two identifiers corresponding to the network device can be stored in an element whose length is 128 bits in the segment list, and each identifier does not need to occupy 128 bits. Therefore, a length of the segment list is reduced, a length of the packet is reduced, and packet transmission efficiency is improved. A quantity of identifiers stored in each 128-bit element may be adjusted based on an actual network status. When one 128-bit element includes a plurality of identifiers, these identifiers may be understood as compressed segment identifiers (or referred to as a micro segment ID, uSID). A location of the compressed segment identifier in the element can be accurately and quickly obtained by using the first pointer included in the packet header.

In an optional implementation, the plurality of identifiers are mapped to a plurality of segment identifiers in a one-to-one manner, each of the plurality of segment identifiers corresponds to one network device or one link, each of the plurality of segment identifiers includes a first part and a second part, the first part in each of the plurality of segment identifiers is the prefix part, prefix parts in the plurality of segment identifiers are the same, and each of the plurality of identifiers includes a second part in a segment identifier to which the identifier is mapped. The uSID may be obtained by omitting a part of content in the SID. In a domain, BLOCK parts in SIDs of all network devices are the same. Therefore, the uSID may be obtained by omitting the BLOCK part in the SID, and the uSID is placed in the segment list, to reduce a length of the segment list.

In an optional implementation, the second packet header includes a destination address (DA) field, and the destination address field includes a first part and a second part. The copying at least one identifier starting from the first identifier to a second packet header of the first packet includes: copying the at least one identifier starting from the first identifier to the second part in the destination address field. The first identifier is an identifier to be added to the DA field, and may also be referred to as a to-be-added identifier. In addition, the first identifier may be a uSID. When an element in the segment list includes a plurality of identifiers, the network device determines the first identifier from the plurality of identifiers based on the first pointer, and copies the at least one identifier starting from the first identifier to the DA field, where the prefix part in the SID is also directly placed in the DA field, so that the prefix part in the SID and the at least one identifier starting from the first identifier are combined to guide packet forwarding.

In an optional implementation, lengths of the plurality of identifiers are the same. Before the copying at least one identifier starting from the first identifier to a second packet header of the first packet, the method further includes: determining a quantity of the at least one identifier based on the lengths of the plurality of identifiers and a length of the prefix part. In the DA field, one part is occupied by a prefix part, and the other part is occupied by at least one uSID that is copied to the DA field. The network device may determine, based on a length of the uSID and a length of the prefix part, a quantity of the at least one uSID that can be copied to the DA field.

In an optional implementation, the segment list does not include the prefix part. When adding an SRH to a packet, a head node also stores a currently to-be-processed uSID and a BLOCK part corresponding to the uSID in the DA field. A uSID adjacent to the BLOCK part in the DA field may be referred to as an active uSID. Therefore, for the active uSID and another uSID corresponding to a same prefix part as the active uSID, the segment list may not store prefix parts corresponding to these uSIDs, but stores only these uSIDs, to reduce a length of the segment list.

In an optional implementation, the first packet includes a destination address field, the destination address field includes a second identifier, and the second identifier is one of the plurality of identifiers. Before the determining a location of a first identifier in the segment list based on a value of the first pointer, the method further includes: determining, based on a switching flag in the second identifier, that the segment list includes an identifier whose type is different from a type of the second identifier; and the copying at least one identifier starting from the first identifier to a second packet header of the first packet includes: copying the at least one identifier to the second packet header to form a forwarding identifier stack, where a type of the at least one identifier is different from the type of the second identifier. The segment list may further include an identifier of another type, for example, an MPLS label or an internet protocol version 4 (IPv4) address. The network device establishes the forwarding identifier stack in a packet header, and copies the identifier of another type to the forwarding identifier stack. Therefore, the method can be compatible with more network scenarios, and an entire forwarding path is programmed by using the segment list, thereby improving forwarding efficiency.

In an optional implementation, the first packet includes a quantity flag. Before the copying at least one identifier starting from the first identifier to a second packet header of the first packet, the method further includes: determining a quantity of the at least one identifier based on a value of the quantity flag. The at least one identifier is an identifier of another type, for example, an MPLS label or an IPv4 address. Before copying the identifier of another type to the forwarding identifier stack, the network device may first determine a quantity of the identifier of another type based on the quantity flag, to copy the corresponding quantity of the identifier of another type to the forwarding identifier stack.

In an optional implementation, the copying the at least one identifier starting from the first identifier to a forwarding identifier stack includes: adding a next identifier of the last identifier in the at least one identifier to the destination address field in the first packet. The network device further copies a compressed segment identifier following the identifier of another type in the segment list to the DA field, so that the network device continues to forward a packet based on the DA field after the forwarding identifier stack is popped up.

In an optional implementation, the at least one identifier is an MPLS label or an IPv4 address. The identifier of another type may be an MPLS label or an IPv4 address.

In an optional implementation, the first pointer is included in the first packet header. The first pointer may be in a specific field in the SRH, or may be in the segment list.

In an optional implementation, after the copying at least one identifier starting from the first identifier to a second packet header of the first packet, the method further includes: modifying the value of the first pointer, so that the modified value of the first pointer is used to indicate a location of the second identifier in the segment list, where the second identifier does not belong to the at least one identifier. The network device modifies the value of the first pointer, so that the value of the first pointer always points to a to-be-added identifier, and therefore the network device on the forwarding path can subsequently continue to determine the to-be-added identifier based on the value of the first pointer.

According to a sixteenth aspect, a method for forwarding a packet is provided. The method includes: receiving a first packet; obtaining a segment list, where the segment list corresponds to a forwarding path of the first packet, the forwarding path includes a plurality of network devices, the segment list includes a plurality of sequentially arranged identifiers, each of the plurality of identifiers corresponds to one of the plurality of network devices or one link on the forwarding path, the segment list includes a first element whose length is 128 bits, and the first element includes at least two adjacent identifiers in the plurality of identifiers; adding the segment list to the first packet to generate a second packet, where the second packet includes a first pointer, a value of the first pointer is used to indicate a location of a first identifier in the segment list, and the first identifier is one of the at least two identifiers; and sending the second packet.

The method may be performed by an ingress node on a forwarding path of a packet.

The segment list may be a segment list in an SRH of an SRv6 packet. At least two identifiers corresponding to the network device can be stored in an element whose length is 128 bits in the segment list, and each identifier does not need to occupy 128 bits. Therefore, a length of the segment list is reduced, a length of the packet is reduced, and packet transmission efficiency is improved. A quantity of identifiers stored in each 128-bit element may be adjusted based on an actual network status. When one 128-bit element includes a plurality of identifiers, the ingress node on the forwarding path of the packet adds a first pointer to a packet header, to indicate locations of different identifiers in the segment list, so that an intermediate node on the forwarding path of the packet can accurately and quickly obtain the locations of the identifiers in the segment list.

In an optional implementation, the plurality of identifiers are mapped to a plurality of segment identifiers in a one-to-one manner, each of the plurality of segment identifiers corresponds to one of the plurality of network devices or one link on the forwarding path, each of the plurality of segment identifiers includes a first part and a second part, the first part in each segment identifier is a prefix part, prefix parts in the plurality of segment identifiers are the same, and each of the plurality of identifiers includes a second part in a segment identifier to which the identifier is mapped. A uSID may be obtained by omitting a part of content in the SID. In a domain, BLOCK parts in SIDs of all network devices are the same. Therefore, the uSID may be obtained by omitting the BLOCK part in the SID, and the uSID is placed in the segment list, to reduce a length of the segment list.

In an optional implementation, a packet header of the first packet includes a destination address field, and the destination address field includes a first part and a second part. The adding the segment list to the first packet to generate a second packet includes: adding the prefix part to the first part in the destination address field; and adding one or more of the plurality of identifiers to the second part in the destination address field. Because the prefix part in the SID is omitted in the uSID in the segment list, the ingress node on the forwarding path directly adds the prefix part to the DA field, and further adds the $1^{st}$ identifier in the segment list to the DA field, so that the prefix part in the SID and the first identifier are combined to guide packet forwarding.

In an optional implementation, the segment list does not include the prefix part. The prefix part in the SID is stored in the DA field. The segment list stores only the uSID, but does not store the prefix part in the SID, to reduce a length of the segment list.

In an optional implementation, at least one of the plurality of identifiers is an MPLS label or an IPv4 address.

In an optional implementation, the second packet includes a quantity flag, and a value of the quantity flag is used to indicate a quantity of the at least one identifier. The segment list may further include an identifier of another type. In this case, the ingress node on the forwarding path adds the quantity flag to the packet, to indicate a quantity of the identifier of another type.

In an optional implementation, the first pointer is located in a packet header of the second packet. The first pointer may be in a specific field in the SRH, or may be in the segment list.

In an optional implementation, the obtaining a segment list includes: receiving the segment list. The segment list may be received by the ingress node on the forwarding path from a controller in a network.

In an optional implementation, the obtaining a segment list includes: determining the forwarding path of the first packet, and generating the segment list corresponding to the forwarding path. The segment list may be generated by the ingress node on the forwarding path.

BRIEF DESCRIPTION OF DRAWINGS

To describe the technical solutions of this disclosure more clearly, the following briefly describes the accompanying drawings for describing the embodiments. It is clear that the following accompanying drawings merely show some embodiments of this disclosure, and a person of ordinary skill in the art can derive other technical solutions and accompanying drawings from these accompanying drawings without creative efforts.

FIG. 6 is a schematic structural diagram of a segment list according to an embodiment of this disclosure;

FIG. 7 is a schematic structural diagram of a segment list according to an embodiment of this disclosure;

FIG. 8 is a schematic structural diagram of a segment list according to an embodiment of this disclosure;

FIG. 9 is a schematic structural diagram of a packet according to an embodiment of this disclosure;

FIG. 10 is a schematic structural diagram of a packet according to an embodiment of this disclosure;

FIG. 11 is a schematic structural diagram of a packet according to an embodiment of this disclosure;

FIG. 12 is a schematic structural diagram of a packet according to an embodiment of this disclosure;

FIG. 13 is a schematic structural diagram of a packet according to an embodiment of this disclosure;

FIG. 14 is a schematic structural diagram of a packet according to an embodiment of this disclosure;

FIG. 15 is a schematic structural diagram of a packet according to an embodiment of this disclosure;

FIG. 16 is a schematic structural diagram of a packet according to an embodiment of this disclosure;

DESCRIPTION OF EMBODIMENTS

The following describes the embodiments of this disclosure with reference to accompanying drawings.

Figure 1:
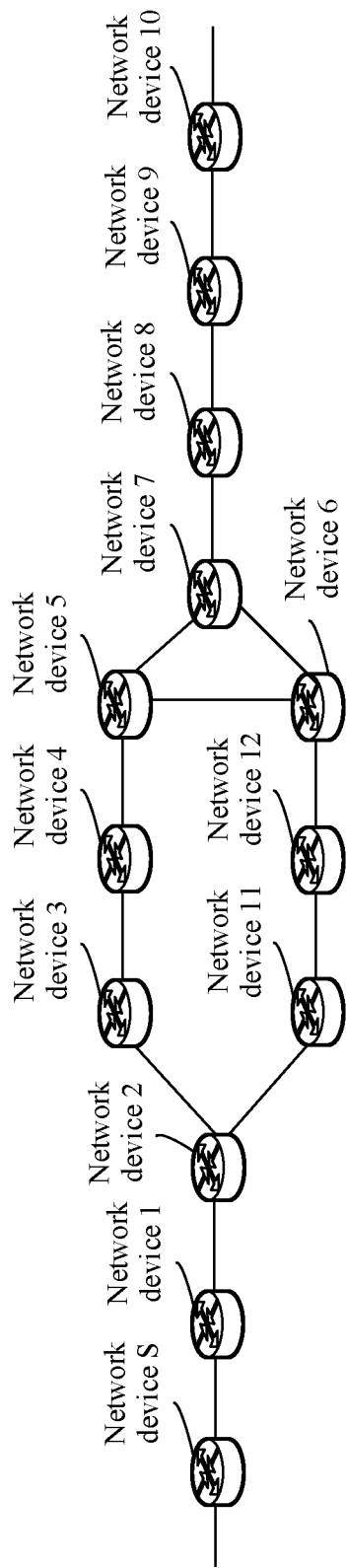
FIG. 1 is a schematic diagram of an application scenario according to an embodiment of this disclosure.

FIG. 1 shows a possible application scenario according to an embodiment of this disclosure. A network in the application scenario includes network devices, specifically including a network device S, a network device 1, a network device 2, a network device 3, a network device 4, a network device 5, a network device 6, a network device 7, a network device 8, a network device 9, a network device 10, a network device 11, and a network device 12. These network devices may be switches, routers, or forwarders. The network device S may be a network ingress device. The network may further include a controller, which is not shown in FIG. 1. The controller may be connected to the network devices 1 to 10. The controller may generate a segment list corresponding to a forwarding path of a packet, and send the segment list to the network ingress device. The controller may send a control packet that includes network configuration information to the network devices 1 to 12. The network device in this embodiment of this disclosure may also be referred to as a network node or a node.

The network device S is a network device that supports SR. The network device 1 to the network device 12 may be network devices that support SR. Specifically, the network devices may be network devices that support SRv6, or the network devices may be network devices that support MPLS. The network device 1 to the network device 12 may alternatively be network devices that support IPv4 but do not support SR.

Figure 2:
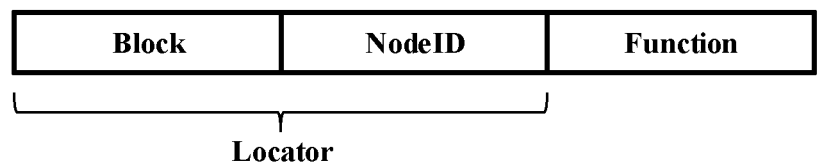
FIG. 2 is a schematic diagram of a format of an SID according to an embodiment of this disclosure.

In an SR network, a packet processing process includes a plurality of segments, and each segment is an instruction or an instruction set for processing a packet. In an SRv6 network, each segment has a corresponding segment identifier, namely, an SID. The segment identifier includes two types: a node segment identifier (node SID) and an adjacent segment identifier (adjacent SID). FIG. 2 shows a format of an SID in an SRv6 network. As shown in FIG. 2, each SID may include a locator field and a function field.

The locator field in the SID is used to locate a specific network device that executes an instruction or an instruction set included in a segment. The locator field includes a prefix (BLOCK) part and a sequence number (Node ID) part. In an SRv6 network domain, prefix parts in SIDs of network devices may be the same. In an SRv6 network domain, sequence number parts in SIDs of network devices are different, and each sequence number part is used to uniquely determine a network device in the domain. For a specific SID, a network device uniquely determined by using a sequence number part in the SID is a network device that executes a segment identified by the SID.

The function field in the SID is used to indicate specific content of the instruction or the instruction set included in the segment, namely, a function in the SRv6 network. The function in the SRv6 network may further include a parameter, and the parameter is indicated by a parameter (Argument) field (not shown in FIG. 2) in the SID. When the function does not include the parameter, the SID may not include the parameter field.

Generally, a total length of the SID in the SRv6 network is 128 bits. The locator field and the function field are separately of specific lengths, and these specific lengths may be changed through a network setting. For example, the locator field is 48 bits, and the function field is 80 bits. Alternatively, the locator field is 64 bits, and the function field is 64 bits. Alternatively, the locator field is 48 bits, the function field is 64 bits, and the parameter field is 16 bits.

Figure 3:
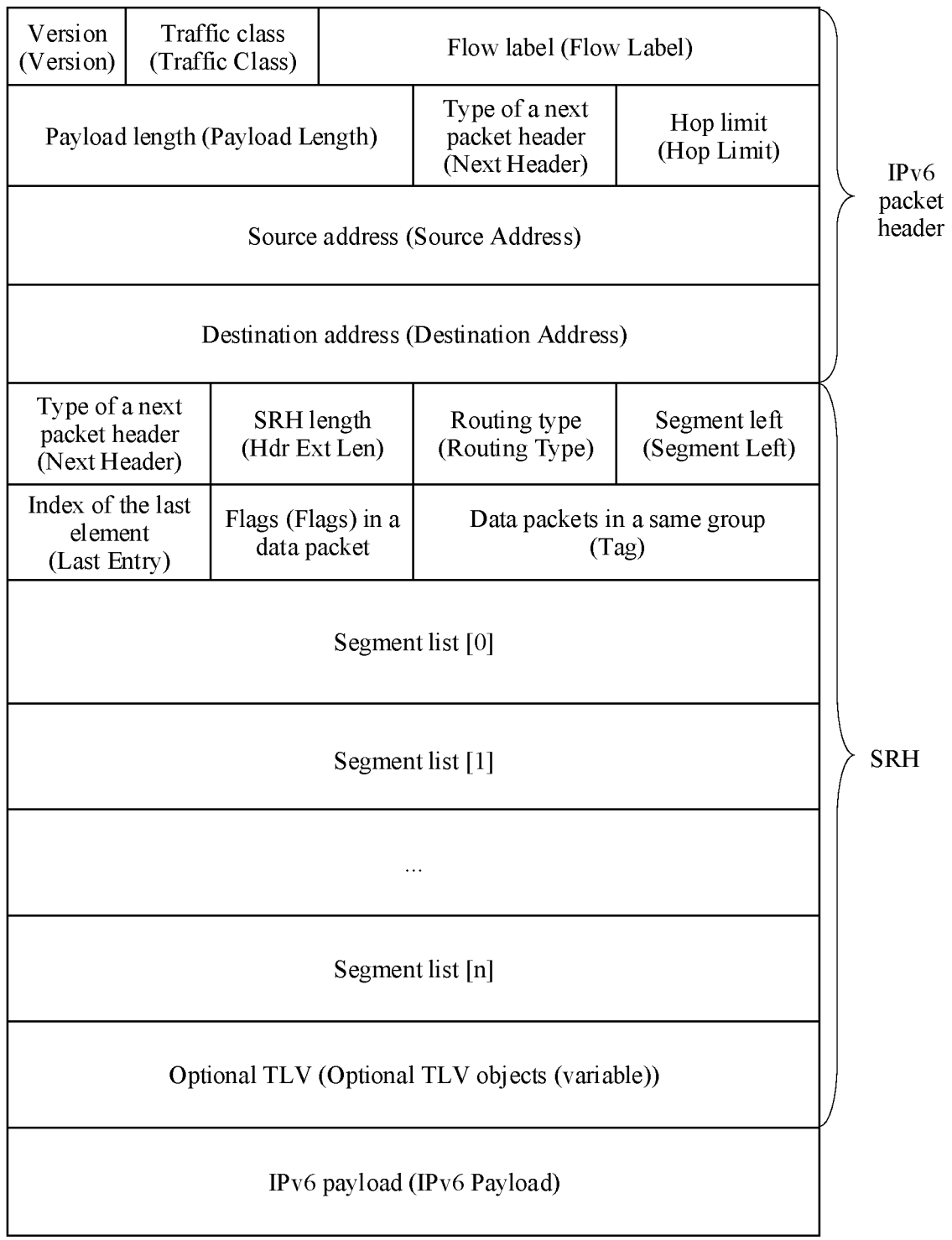
FIG. 3 is a schematic structural diagram of a packet according to an embodiment of this disclosure.

A segment list includes a plurality of SIDs. FIG. 3 shows a format of a packet in an SRv6 network. As shown in FIG. 3, a packet header of the packet includes an IPv6 packet header and an SRH. The IPv6 packet header includes a destination address (DA) field. The SRH includes a segment list, and the segment list includes a plurality of sequentially arranged SIDs. These SIDs may be node segment identifiers, adjacent segment identifiers, or a combination of a node segment identifier and an adjacent segment identifier.

The segment list may be encapsulated by an ingress node on a forwarding path of a packet in the packet. A network device on the forwarding path of the packet may subsequently process the packet based on the segment list in the packet. Specifically, the packet is sent by the ingress node on the forwarding path, and is received by a specific network device on the forwarding path. If the network device determines that the DA field in the IPv6 packet header of the packet includes an SID of the network device, the network device processes the packet according to an instruction set corresponding to a segment identified by the SID. The specific manner of processing the packet may be, for example, forwarding the packet. The network device further needs to update the DA field. In a process of updating the DA field, a segment left (SL) pointer in the SRH needs to be used. As shown in FIG. 3, the segment list includes the plurality of sequentially arranged SIDs: a segment list [0] to a segment list [n]. The plurality of SIDs separately correspond to a plurality of network devices on the forwarding path of the packet, and the plurality of network devices separately execute instruction sets corresponding to a plurality of segments. The SL pointer may sequentially point to the plurality of SIDs in the segment list. Specifically, in a packet processing process, a value of the SL pointer is updated once a segment is executed. After each update, a location to which the SL pointer points in the segment list is offset by a length of one SID, namely, 128 bits. As a plurality of segments indicated by the plurality of SIDs in the segment list are sequentially executed, the value of the SL pointer is updated continuously. Therefore, the SL pointer is used to indicate a quantity of remaining to-be-processed segments in the segment list. In other words, each value of the SL pointer corresponds to a specific quantity of remaining to-be-processed segments in the segment list, and the SL pointer always points to a currently to-be-processed SID. In addition, based on a sequence of the segments, indicated by the plurality of SIDs, in the packet processing process, the plurality of SIDs are arranged in descending order in the segment list. To be specific, an SID of a segment that is first executed is arranged at a bottom of the segment list, SIDs of segments that are subsequently executed are sequentially arranged upward, and an SID of a segment that is last executed is arranged at a top of the segment list. Referring to FIG. 3, the segment list [n] indicates the segment that is first executed, and the segment list [0] indicates the segment that is last executed. For example, if the value of the SL pointer is 3, it indicates that the quantity of remaining to-be-processed segments in the segment list is 4, or it may be understood that the SL pointer points to the currently to-be-processed SID, namely, the fourth SID counted from bottom to top. If the value of the SL pointer is 0, it indicates that the quantity of remaining to-be-processed segments is 1, or it may be understood that the SL pointer points to the currently to-be-processed SID, namely, the last SID counted from bottom to top, namely, the segment list [0] in FIG. 3. After determining the currently to-be-processed SID based on the SL pointer, the network device copies the SID to the DA field in the IPv6 packet header, to subsequently process the packet based on content in the DA field. The specific manner of processing the packet may be, for example, forwarding the packet.

The packet may be processed through the network shown in FIG. 1. For example, the processing manner may be forwarding. To be specific, the packet is forwarded through the network shown in FIG. 1. For example, the network device S sends a packet to the network device 10. In this case, a forwarding path of the packet is: the network device S->the network device 1->the network device 2->the network device 3->the network device 4->the network device 5->the network device 6->the network device 7->the network device 8->the network device 9->the network device 10. In other words, the network device S is a head node on the forwarding path. In addition to the head node, namely, the network device S, the forwarding path further includes a total of 10 network devices, namely, the network device 1 to the network device 10. If all the 10 network devices are network devices that support SRv6, and forwarding behavior of each network device corresponds to one segment, it indicates that a segment list in an entire packet forwarding process includes 10 SIDs. A length of each SID is 128 bits, and a length of the segment list is 160 bytes. Therefore, due to existence of the segment list in the packet, a length of the packet increases, and network transmission efficiency and processing efficiency are reduced.

An embodiment of this disclosure provides a method for forwarding a packet, and a device and a system that are based on the method. The method, the device, and the system are based on a same inventive concept. According to the method, a compressed segment identifier with a relatively small length can be used to replace an SID whose length is 128 bits, to reduce a length of a segment list, reduce a length of a packet, and improve network transmission efficiency and processing efficiency.

An embodiment of the present invention provides a method for forwarding a packet. The method is applied to each node on a forwarding path of the packet. With reference to the application scenario shown in FIG. 1, the network device S sends a packet to the network device 10. In this case, a forwarding path of the packet is: the network device S->the network device 1->the network device 2->the network device 3->the network device 4->the network device 5->the network device 6->the network device 7->the network device 8->the network device 9->the network device 10. The method includes the following steps.

The network device S receives a packet. The network device S is a network ingress device in a network, and is an ingress node on a forwarding path of the packet. The network device S receives the packet. The packet may be a packet generated by a host (not shown in FIG. 1), and the host may be a terminal device such as a personal computer, a mobile phone, or a tablet computer.

As the ingress node on the forwarding path of the packet, the network device S needs to determine a forwarding path of the received packet. Optionally, the network device S may find, from a plurality of stored forwarding paths based on a characteristic of the packet, a forwarding path used to forward the packet, to determine the forwarding path of the packet. The plurality of stored forwarding paths may be received by the network device S from a controller in the network. The characteristic of the packet may be any element or a combination of a plurality of elements in a 5-tuple of the packet, and elements included in the 5-tuple are a source IP address, a source port, a destination IP address, a destination port, and a protocol number that are of the packet. Optionally, the network device S may alternatively obtain, through calculation based on information carried in the packet and network topology information, a forwarding path used to forward the packet. The forwarding path includes a plurality of network devices. With reference to the application scenario shown in FIG. 1, the network device S sends a packet to the network device 10. In this case, a forwarding path of the packet is: the network device S->the network device 1->the network device 2->the network device 3->the network device 4->the network device 5->the network device 6->the network device 7->the network device 8->the network device 9->the network device 10.

Figures 4, 5:
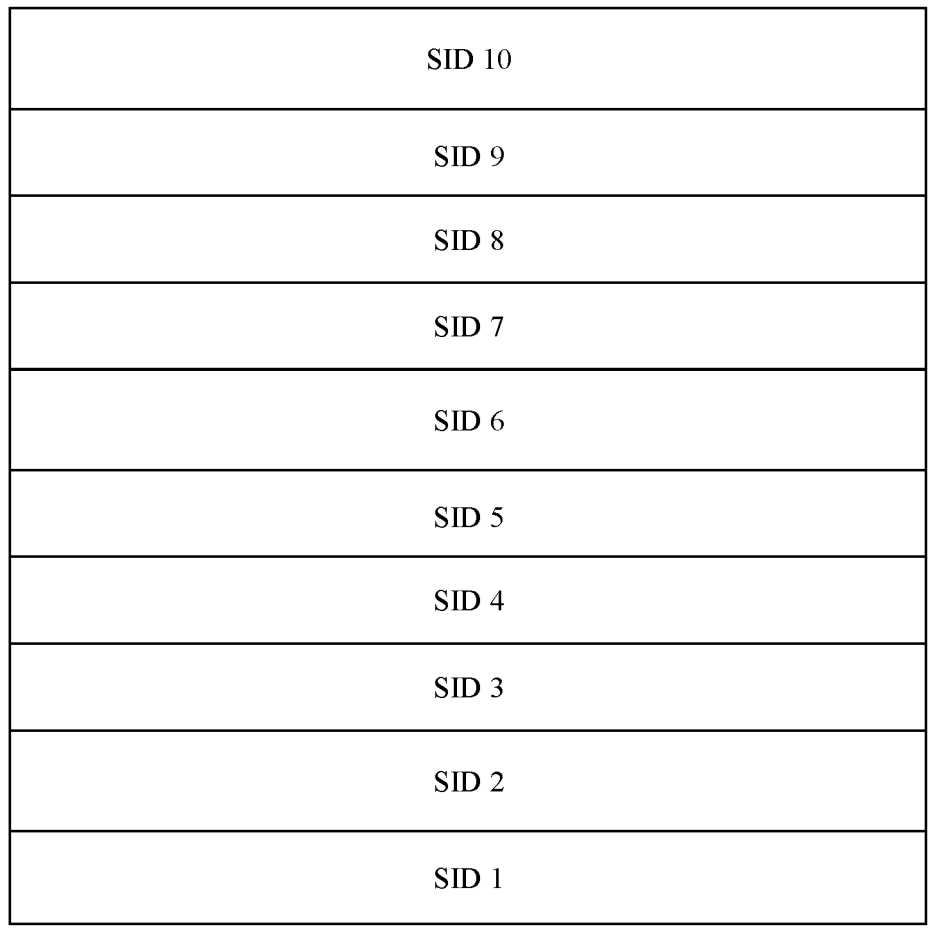
FIG. 4 is a schematic structural diagram of a segment list according to an embodiment of this disclosure.
FIG. 5 is a schematic structural diagram of an SID according to an embodiment of this disclosure.

The network device S obtains a segment list. The segment list may be a segment list in an SRH of an SRv6 packet. As shown in FIG. 4, in this case, the segment list corresponds to a forwarding path of a packet, the forwarding path includes the network device 1 to the network device 10, the segment list includes a plurality of sequentially arranged SIDs, each of the plurality of SIDs corresponds to one of the plurality of network devices or one link on the forwarding path, and a length of each SID is 128 bits.

The segment list may be received by the network device S from the controller and stored in the device. Specifically, the network device S finds, from a plurality of stored forwarding paths, a forwarding path used to forward the packet, and finds a segment list corresponding to the forwarding path. The segment list may alternatively be generated by the network device S. Specifically, the network device S obtains, through calculation based on information carried in the packet, a forwarding path used to forward the packet, and generates a segment list corresponding to the forwarding path.

In an SRv6 network, the forwarding path of the packet may also be indicated by a plurality of segments. Each segment is executed by a specific network device, and each segment has a corresponding SID. Therefore, for one segment, there is a correspondence between an SID of the segment and a network device that executes the segment. In other words, the SID corresponds to one network device, or it may be considered that the SID is an SID of one network device.

An example is used for description with reference to the application scenario shown in FIG. 1. A segment identifier of the network device 1 may be A:1:01:11::, a length of the segment identifier is 128 bits, and "::" indicates an all-zeros byte. A:1:01 is a locator field whose length is 48 bits, A:1/48 is a BLOCK part whose length is 32 bits, "/48" indicates a 48-bit mask, and 01 is a sequence number part whose length is 16 bits. In other words, the length of the locator field is 48 bits. 11:: is a function field whose length is 80 bits. Similarly, the network device 2, the network device 3, the network device 4, the network device 5, the network device 6, the network device 7, the network device 8, the network device 9, or the network device 10 may also be network devices in a same domain. In this case, segment identifiers of these network devices may be respectively A:1:02:22::, A:1:03:33::, A:1:04:44::, A:1:05:55::, A:1:06:66::, A:1:07:77::, A:1:08:88::, A:1:09:99::, and A:1:0a:aa::.

To reduce a length of each SID, a part or some parts in the SID may be omitted to form a compressed segment identifier (or referred to as a micro segment ID, uSID). The uSID is used to replace the SID and is placed in a segment list, so that a length of the segment list can be reduced.

In a domain, BLOCK parts in SIDs of all network devices may be the same. Therefore, in a segment list, to reduce a length of each SID, the BLOCK part in the SID may be omitted to form a uSID. To be specific, the SID of the network device is divided into two parts. A first part is a BLOCK part, and a second part is a part other than the BLOCK part in the SID. When the SID is placed in the segment list, a same BLOCK part is omitted. For example, an SID of the network device 1 in FIG. 1 is A:1:01:11::, where A:1/48 is a BLOCK part, and 01 is a sequence number part whose length is 16 bits. The BLOCK part in the SID is omitted. In this case, a remaining part is 01:11:: and has a length of 96 bits. Similarly, BLOCK parts in locator fields in SIDs of the network device 2, the network device 3, the network device 4, the network device 5, the network device 6, the network device 7, the network device 8, the network device 9, and the network device 10 may be omitted. In this case, remaining parts are respectively 02:22::, 03:33::, 04:44::, 05:55::, 06:66::, 07:77::, 08:88::, 09:99::, and 0a:aa::. Lengths of the remaining parts each are less than the length of the SID.

Optionally, in a segment list, to reduce a length of an SID, a function field in the SID may be further set to a compressed format, and the function field in the compressed format is less than a function field in a non-compressed format. During SID planning, all function fields are divided into two parts: compressed function fields and non-compressed function fields. FIG. 5 shows an SID including a compressed function field and an SID including a non-compressed function field. The compressed function field is used to indicate a commonly used function, and the non-compressed function field is used to indicate an uncommonly used function. A length of the compressed function field is less than a length of the non-compressed function field. For example, the length of the compressed function field is 16 bits, and the length of the non-compressed function field is 80 bits. As shown in FIG. 5, when the compressed function field is used for the SID, a padding part follows the compressed function field, and the padding part includes same specific content, so that a length of the entire SID is still 128 bits. For example, the padding part may be all zeros. Therefore, to reduce the length of the SID, when a function field in the SID is the compressed function field, the padding part following the compressed function field may be omitted to form a uSID. For example, an SID of the network device 1 in FIG. 1 may be A:1:01:11::, where 11 is a function field and is a compressed function field whose length is 16 bits. To be specific, a length of a padding part is 64 bits. The padding part following the compressed function field in the SID is omitted. In this case, a remaining part is A:1:01:11 and has a length of 64 bits. Similarly, padding parts following compressed function fields in SIDs of the network device 2, the network device 3, the network device 4, the network device 5, the network device 6, the network device 7, the network device 8, the network device 9, and the network device 10 may be omitted. In this case, remaining parts are respectively A:1:02:22, A:1:03:33, A:1:04:44, A:1:

05:55, A:1:06:66, A:1:07:77, A:1:08:88, A:1:09:99, and A:1:0a: aa. Lengths of the remaining parts each are less than the length of the SID.

Optionally, the first bit in the compressed function field and the first bit in the non-compressed function field may be set to different values. Therefore, for the obtained SID, the network device may determine, by using the first bit in the function field, whether the function field in the SID is the compressed function field or the non-compressed function field. For example, the first bit in the compressed function field is 0, and the first bit in the non-compressed function field is 1; or the first bit in the compressed function field is 1, and the first bit in the non-compressed function field is 0.

Preferably, if both the BLOCK part in the locator field in the SID and the padding part following the compressed function field in the SID are omitted, a length of a remaining part may be further reduced. In this case, a uSID includes a sequence number part in the locator field in the SID and the compressed function field. For example, both a BLOCK part in an SID of the network device 1 in FIG. 1 and a padding part following a compressed function field may be omitted. In this case, a remaining part is 01:11 and has a length of 32 bits. Similarly, BLOCK parts in locator fields in SIDs of the network device 2, the network device 3, the network device 4, the network device 5, the network device 6, the network device 7, the network device 8, the network device 9, and the network device 10 and padding parts following compressed function fields may be omitted. In this case, remaining parts are respectively 02:22, 03:33, 04:44, 05:55, 06:66, 07:77, 08:88, 09:99, and 0a: aa. Lengths of the remaining parts each are less than the length of the SID.

It can be learned that a length of the uSID is less than 128 bits. Optionally, the length of the uSID is variable. When the uSID includes the sequence number part in the locator field in the SID and the compressed function field, the length of the uSID is determined by a sum of a length of the sequence number part in the locator field in the SID and a length of the compressed function field. For example, the length of the uSID may be 16 bits, 32 bits, 64 bits, or the like. There is a one-to-one mapping relationship between uSIDs and SIDs, and there is also a one-to-one mapping relationship between the uSIDs and segments indicated by the SIDs. In other words, one unique uSID may be obtained for each SID, and there is the one-to-one mapping relationship between the SIDs and the uSIDs. Therefore, for one segment, there is a correspondence between a uSID of the segment and an SID of the segment, and there is a correspondence between the uSID of the segment and a network device that executes the segment. In other words, the uSID corresponds to one network device, or it may be considered that the uSID is a uSID of one network device.

Optionally, lengths of compressed function fields in all SIDs are the same, and lengths of all uSIDs are the same.

A plurality of SIDs are sequentially arranged based on a sequence of corresponding network devices on the forwarding path, to form a segment list. The SID in the segment list is replaced with a corresponding uSID, to reduce a length of the segment list, reduce a length of a packet, and improve network efficiency.

In this embodiment of this disclosure, space in the segment list is divided into a plurality of elements, and after each update, an SL pointer points to a different element. For example, space occupied by each SID may be divided into one element. To be specific, a length of each element is 128 bits, and after each update, a location to which the SL pointer points in the segment list is still offset by 128 bits. A plurality of elements in the segment list may be sorted based on an offset sequence of the SL pointer. An element to which the SL pointer initially points may be referred to as the $1^{st}$ element, and other elements are obtained by analogy. Because a length of the uSID is less than 128 bits, for example, the length of the uSID may be 32 bits, the network device S stores a plurality of uSIDs, for example, at least two uSIDs, in an element whose length is 128 bits in the segment list, to reduce the length of the segment list. Optionally, a BLOCK part in a locator field in the SID may be included in the segment list, and the BLOCK part may be included in the Pt element in the segment list. Optionally, a BLOCK part in a locator field in the SID may not be included in the segment list. FIG. 6 shows a structure of a segment list. For example, when a length of a uSID is 32 bits, four uSIDs are stored in each element in the segment list. For example, a uSID 1, a uSID 2, a uSID 3, and a uSID 4 are stored in the $1^{st}$ element, and a uSID 5, a uSID 6, a uSID 7, and a uSID 8 are stored in the $2^{nd}$ element.

Therefore, the network device S obtains a segment list. The segment list corresponds to a forwarding path of a first packet, the forwarding path includes a plurality of network devices, the segment list includes a plurality of sequentially arranged identifiers, an identifier in the plurality of identifiers corresponds to one of the plurality of network devices or one link on the forwarding path, the segment list includes an element whose length is 128 bits, and the element includes at least two adjacent identifiers in the plurality of identifiers.

In this embodiment of this disclosure, a plurality of uSIDs in the segment list are sequentially arranged based on a sequence of corresponding network devices on the forwarding path. However, a manner in which the plurality of uSIDs are arranged in the element is not limited. The plurality of uSIDs may be arranged in the element in sequence or in reverse order. As shown in FIG. 6, an arrangement sequence of the four uSIDs stored in the $1^{st}$ element may be the uSID 1, the uSID 2, the uSID 3, and the uSID 4 from top to bottom, or an arrangement sequence of the four uSIDs may be the uSID 4, the uSID 3, the uSID 2, and the uSID 1 from top to bottom.

Optionally, a network device that generates the segment list may choose whether to generate a segment list including the uSID. The network device may advertise masks with different lengths, which respectively correspond to a compressed function field and a non-compressed function field. For example, a length of the mask of the compressed segment identifier is a sum of a length of a locator field in the SID and a length of the compressed function field, and a length of the mask of the non-compressed segment identifier is a sum of the length of the locator field in the SID and a length of the non-compressed function field. In addition, the length of the mask of the compressed segment identifier is less than the length of the mask of the non-compressed segment identifier. With reference to the application scenario shown in FIG. 1, a length of a compressed mask corresponding to the network device 1 is 64 bits, and a length of a non-compressed mask corresponding to the network device 1 is 128 bits. Therefore, the network device that generates the segment list obtains the masks with different lengths that are advertised by another network device. When generating the segment list including the uSID, the network device that generates the segment list binds the segment list including the uSID to the mask of the compressed segment identifier. When generating a segment list including the SID, the network device that generates the segment list binds the segment list including the SID to the non-compressed mask. Therefore, after the segment list is encapsulated in the packet, a network device that forwards the packet can obtain the SID or the uSID from the segment list by using the masks with different lengths.

Optionally, the segment list may include both the uSID and an identifier of another type. The identifier of another type may be the SID. To be specific, the SID may still be included in the segment list in which the uSID is used. Among all network devices through which the packet passes, a network device may not have a capability of processing a uSID. In this case, an SID that corresponds to the network device and whose length is 128 bits may still be stored in the segment list, to improve network compatibility. As shown in FIG. 6, when the network device 9 does not have a capability of processing a uSID, the segment list stores an SID 9 corresponding to the network device 9, namely, A:1:09:99:: whose length is 128 bits.

Optionally, the network device that generates the segment list may determine, based on whether another network device has a capability of processing a uSID, whether a uSID or an SID of the another network device is to be placed in the segment list. The network device that generates the segment list may be a controller in a network, or may be an ingress node on the forwarding path of the packet, for example, the network device S shown in FIG. 1. For example, the network device S obtains a compression capability flag corresponding to the network device 9, where the compression capability flag is used to indicate whether the network device 9 has a capability of processing a uSID. When the compression capability flag indicates that the network device 9 has the capability of processing a uSID, the network device S stores a uSID corresponding to the network device 9 in the generated segment list. When the compression capability flag indicates that the network device 9 does not have the capability of processing a uSID, the network device S stores an SID corresponding to the network device 9 in the generated segment list.

Optionally, when an SID that corresponds to a network device and whose length is 128 bits is stored in the segment list, a prompt flag is included in the last uSID before the segment identifier in the segment list, and the prompt flag is used to indicate that a next identifier of the current uSID is an SID whose length is 128 bits. Optionally, the prompt flag may be included in a compressed function field part in the uSID. For example, two associated compressed function fields may be set for each uSID. When the uSID includes a prompt flag, one of the compressed function fields is used. When the uSID does not include a prompt flag, the other compressed function field is used. As shown in FIG. 6, two associated compressed function fields 87 and 88 may be set for a uSID 8. When the uSID 8 includes a prompt flag, the compressed function field 87 is used. When the uSID 8 does not include a prompt flag, the compressed function field 88 is used. Because the segment list shown in FIG. 6 stores the SID 9 that corresponds to the network device 9 and whose length is 128 bits, the uSID 8 needs to include a prompt flag, that is, the uSID 8 is 08:87.

Optionally, when an SID that corresponds to a network device and whose length is 128 bits is stored in the segment list, a prompt flag may be included in a uSID other than the last uSID in a plurality of consecutive uSIDs, and the prompt flag is used to indicate that a next identifier of the current uSID is still a uSID whose length is less than 128 bits. Optionally, the prompt flag may be included in a compressed function field part in the uSID. For example, two associated compressed function fields may be set for each uSID. When the uSID includes a prompt flag, one of the compressed function fields is used. When the uSID does not include a prompt flag, the other compressed function field is used. As shown in FIG. 6, two associated compressed function fields 77 and 78 may be set for a uSID 7. When the uSID 7 includes a prompt flag, the compressed function field 77 is used. When the uSID 7 does not include a prompt flag, the compressed function field 78 is used. Because the segment list shown in FIG. 6 stores the uSID 8 that corresponds to the network device 8 and whose length is less than 128 bits, the uSID 7 needs to include a prompt flag, that is, the uSID 7 is 07:77.

Optionally, when the segment list includes both a uSID and an identifier of another type, a prompt flag may be set at an interval of a fixed length. The prompt flag is used to indicate a type of an identifier in a next fixed length, that is, used to indicate a length of a single identifier in the next fixed length. For example, the fixed length may be 128 bits. Optionally, the prompt flag may be located in the last identifier in the fixed length, or the prompt flag may be an independent identifier, and is not included in any identifier corresponding to the network device. Different values of the prompt flag correspond to identifiers of different types. As shown in FIG. 6, a prompt flag may be set at an interval of 128 bits. The prompt flag is located in the last identifier in the 128 bits. When a value of the prompt flag in the uSID 8 is 0, it indicates that a type of an identifier in next 128 bits is an SID. Specifically, the identifier in the next 128 bits is the SID 9. When a value of the prompt flag in the uSID 4 is 1, it indicates that a type of an identifier in next 128 bits is a uSID. Specifically, the identifiers in the next 128 bits are the uSID 5, the uSID 6, the uSID 7, and the uSID 8.

Optionally, when the segment list includes both a uSID and an identifier of another type, a prompt flag may alternatively be set at an interval of a fixed length. The prompt flag is used to indicate whether a next fixed length still belongs to the current identifier. Therefore, a boundary of the current identifier may be determined based on the prompt flag, to determine that the current identifier is an SID whose length is 128 bits or a uSID whose length is less than 128 bits. For example, the fixed length may be 32 bits. The fixed length may alternatively be 8 bits, 16 bits, or the like. For example, the prompt flag may be located in one bit. For example, the prompt flag may be located in the first bit or the last bit in the fixed length. As shown in FIG. 6, a prompt flag may be set at an interval of 32 bits. The prompt flag is located in the last bit in the 32 bits. When a value of the bit is 1, it indicates that a next fixed length still belongs to the current identifier. When a value of the bit is 0, it indicates that a next fixed length no longer belongs to the current identifier. For the 32 bits to which the uSID 7 belongs, when a value of the last bit is 0, it indicates that subsequent 32 bits no longer belong to the current identifier. In other words, the subsequent 32 bits are the uSID 8. For the 32 bits to which the SID 8 belongs, when a value of the last bit is 0, it indicates that subsequent 32 bits no longer belong to the current identifier. In other words, the subsequent 32 bits are the first 32 bits in the SID 9. For the first 32 bits in the SID 9, when a value of the last bit is 1, it indicates that subsequent 32 bits still belong to the current identifier. In other words, the subsequent 32 bits are the second 32 bits in the SID 9.

Optionally, after the SID whose length is 128 bits is stored in the segment list, a BLOCK part in the SID needs to be placed at a start location of a next element in the SID in the segment list. As shown in FIG. 6, the SID 9 that corresponds to the network device 9 and whose length is 128 bits is stored in the segment list. In this case, a BLOCK part is stored at a start location of a next element in the segment list. The BLOCK part may be A:1 and has a length of 32 bits. A uSID 10 corresponding to the network device 10 continues to be stored after the BLOCK part.

Optionally, in an element in the segment list, a plurality of uSIDs are sequentially stored. After the plurality of uSIDs are stored, if there are still redundant bits at the end of the element, the redundant bits may be padded. For example, the redundant bits are padded with all zeros.

Optionally, when the plurality of network devices on the forwarding path of the packet belong to different domains, a BLOCK part in the SID also needs to be placed in the segment list. In a domain, BLOCK parts in SIDs of all network devices are the same. However, in different domains, the BLOCK parts in the SIDs of the network devices are different. When a network device and a previous-hop network device on the forwarding path belong to different domains, a BLOCK part in an SID of the network device needs to be placed in the segment list. Optionally, the BLOCK part needs to be placed at a start part of an element, in other words, the BLOCK part is placed at a start part of a next element of a uSID of the previous-hop network device, and then the uSID of the network device is placed after the BLOCK part. FIG. 7 shows a structure of a segment list. With reference to the application scenario shown in FIG. 1, the network device 9 and the network device 8 belong to different domains. In this case, an SID of the network device 8 is A:1:8:88::, and an SID of the network device 9 is A2:9:99::. To be specific, a BLOCK part in the SID of the network device 8 is A:1, a BLOCK part in the SID of the network device 9 is A2, a uSID 8 of the network device 8 is 8:88, and a uSID 9 of the network device 9 is 9:99. As shown in FIG. 7, the uSID 9 corresponding to the network device is stored in a next element in the uSID 8, and a BLOCK part is stored before the uSID 9, where the BLOCK part is A2 and has a length of 32 bits.

As the ingress node on the forwarding path of the packet, the network device S adds a segment list to the packet. Specifically, the network device S adds the segment list to an SRH of the packet.

Optionally, the packet further includes an SL pointer. With reference to the foregoing descriptions, the SRH includes the SL pointer, and the SL pointer points to an element in the segment list. In a packet forwarding process, an intermediate node on the forwarding path adds, to a destination address (destination address, DA) field in an IPv6 packet header at an SRH outer layer, an SID stored in the element to which the SL pointer points. In other words, the SL pointer is used to indicate a currently to-be-processed element in the segment list.

When the uSID is used, because a length of the uSID is less than a length of the SID, a plurality of uSIDs may be stored in element space in which one SID is originally stored. Therefore, a new pointer needs to be set to indicate locations of different uSIDs in each element. Optionally, the packet includes a first pointer, a value of the first pointer is used to indicate a location of a first identifier that needs to be copied to a packet header and that is in an element, and the new pointer may be referred to as a PI pointer. The SL in the packet may be referred to as a second pointer, a value of the SL pointer is used to indicate locations of different elements in the segment list, and a value of the PI pointer is used to indicate locations of different uSIDs in the element. The PI pointer and the SL pointer jointly form a two-dimensional pointer. Therefore, the intermediate node on the forwarding path can determine a currently to-be-added identifier in the element in the segment list based on the value of the PI pointer, for example, a currently to-be-added uSID.

The PI pointer may be located in a packet header, and the packet header may be an SRH or an IPv6 packet header. For example, the PI pointer may be located in a PI field in the SRH, or the PI pointer may be located in a DA field in the IPv6 packet header. The PI pointer may alternatively be located in the segment list. For example, the PI pointer may be located in the first uSID in each element in the segment list.

Optionally, the PI pointer may be adjacent to the SL pointer. The two adjacent pointers may be located in a specific field in the SRH, for example, including but not limited to an SL field. For example, the PI pointer is a part of the SL field in the SRH. Specifically, several bits at the end of the SL field may be classified as the PI pointer, and another part in the SL field is used as the SL pointer. For example, the last two bits in the SL field may be classified as the PI pointer, and another part in the SL field is used as the SL pointer. To be specific, the PI pointer may be the last two bits in the SL field, namely, a least significant bit and a second least significant bit. In this case, the SL pointer is used to indicate a currently to-be-processed element in the segment list, and the PI pointer is used to indicate a location of the first identifier that needs to be copied to the packet header and that is in the currently to-be-processed element. In this case, because the SL pointer is adjacent to the PI pointer, an entirety including the SL pointer and the PI pointer may also be considered as a new pointer, and the SL pointer and the PI pointer are separately a part of the new pointer.

Optionally, the packet may include only a first pointer, a value of the first pointer is used to indicate a location of a first identifier that needs to be copied to a packet header and that is in the segment list, and the new first pointer may be referred to as an XL pointer. The XL pointer is a one-dimensional pointer. Optionally, the XL pointer may be located in a specific field in an SRH, for example, an SL field. To be specific, the entire SL field may be used as the XL pointer. Specifically, the XL pointer may sequentially point to a plurality of identifiers in the segment list. The plurality of identifiers may be identifiers of a plurality of types, for example, SIDS or uSIDs. In a packet processing process, each time content indicated by an identifier in the segment list is executed, a location to which the XL pointer points in the segment list is offset by a length of an identifier corresponding to the segment. For example, when an offset identifier is the SID, the length is 128 bits. When an offset identifier is the uSID, the length is less than 128 bits. As a plurality of segments indicated by a plurality of identifiers in the segment list are sequentially executed, a location to which the XL pointer points is continuously offset. Therefore, the XL pointer is used to indicate a location of a currently to-be-processed identifier in the segment list.

Optionally, the network device S further adds a BLOCK part in an SID to a DA field in an IPv6 packet header of the packet. Optionally, the network device S further adds at least one identifier to the DA field. The at least one identifier may be a plurality of identifiers. The plurality of identifiers may be a plurality of uSIDs, or may be a combination of a uSID and an identifier of another type. To be specific, the DA field in the IPv6 packet header of the packet may also be divided into two parts. A BLOCK part omitted in the segment list is placed in a first part of the DA field, and at least one identifier is placed in a second part of the DA field.

Optionally, a quantity of the at least one identifier added by the network device S to the DA field is determined by a length of the BLOCK part and a length of the identifier. The network device S adds as many identifiers as possible to a part other than the BLOCK part in the DA field. For example, when the plurality of identifiers are the plurality of uSIDs, a quantity of the plurality of uSIDs may be an integer part of $(128-L_{BLOCK})/L_{uSID}$, where $L_{BLOCK}$ is a length of a BLOCK part, and $L_{uSID}$ is a length of a uSID. For example, when the length of the BLOCK part is 32 bits, and the length of the uSID is 32 bits, three uSIDs are added to the DA field. For example, when a length of the identifier of another type is the same as the length of the uSID, a quantity of the plurality of identifiers including the combination of the uSID and the identifier of another type may also be an integer part of $(128-L_{BLOCK})/L_{uSID}$. For example, when the length of the BLOCK part is 32 bits, the length of the uSID is 32 bits, and a length of an MPLS label is 32 bits, a combination of two uSIDs and one MPLS label is added to the DA field.

An example is used for description with reference to FIG. 9. FIG. 9 shows a structure of a packet to which a segment list and a PI pointer are added. The PI pointer is located in a PI field in an SRH. In addition, the network device S adds a BLOCK part in an SID to a DA field, and adds three uSIDs following the BLOCK part in the DA field. As shown in FIG. 9, the three uSIDs are a uSID 1, a uSID 2, and a uSID 3. When a value of the PI pointer is 3, it indicates that the first three uSIDs in the element in the segment list are added to the DA field. A to-be-added identifier, namely, the fourth uSID, namely, a uSID 4, in the element can be determined based on the value of the PI pointer.

The network device S sends the packet. When sending the packet, the network device S determines a next-hop network device of the packet based on content in the DA field according to a longest match rule. The DA field includes a BLOCK part and a plurality of sequentially arranged uSIDs. A combination of the BLOCK part and the first uSID forms an SID corresponding to the first uSID. Therefore, the determined next-hop network device is a network device corresponding to the first uSID.

Referring to the structure of the packet shown in FIG. 9, an example is used for description with reference to the application scenario shown in FIG. 1. The network device S queries a local routing table based on content in the DA field in the packet header of the packet according to a longest match rule. Specifically, a part including the BLOCK part and the uSID 1 is A:1:01:11, matches an entry in the routing table, and successfully matches the SID 1. To be specific, the network device S determines that the next-hop network device is the network device 1, to send a packet including a segment list to the network device 1.

After receiving the packet, the network device 1 queries a local segment identifier table (local SID table) based on the content in the DA field according to the longest match rule, and determines a packet processing action. The DA field includes a BLOCK part and a plurality of sequentially arranged uSIDs. A combination of the BLOCK part and the first uSID forms an SID corresponding to the first uSID. Therefore, the determined packet processing action is a packet processing action corresponding to a function field in the first uSID, and may also be referred to as a packet processing action corresponding to the first uSID.

Referring to the structure of the packet shown in FIG. 9, an example is used for description with reference to the application scenario shown in FIG. 1. A packet including a segment list is sent by the network device S to the network device 1. The network device 1 queries a local segment identifier table based on a DA field in the packet according to a longest match rule. If a part including a BLOCK part and a uSID 1 successfully matches an entry in the local segment identifier table, the network device 1 performs a packet forwarding processing action corresponding to the uSID 1.

Optionally, the packet forwarding processing action may include: updating the DA field. Specifically, the network device 1 deletes a bit with a length of a uSID from a part following the BLOCK part in the DA field, moves a remaining part forward, and pads a blank part at the end with all zeros.

Optionally, after updating the DA field, the network device 1 further determines whether the part following the BLOCK part in the DA field is padded with all zeros. If the part is not padded with all zeros, the network device 1 queries a local routing table based on content in the DA field according to the longest match rule, and continues to forward the packet.

Optionally, after the packet arrives at another intermediate node on the forwarding path, a processing action performed by the another intermediate node on the packet may be the same as the foregoing packet processing action of the network device 1. To be specific, all processing actions performed by a plurality of intermediate nodes on the forwarding path on the packet include: updating the DA field, and determining whether the part following the BLOCK part in the DA field is padded with all zeros.

An example is used for description with reference to the application scenario shown in FIG. 1. When the network device 1 updates a DA field, a uSID 1 following a BLOCK part in the DA field is deleted, a remaining part moves forward, and a blank part at the end is padded with all zeros. In this case, the DA field includes the BLOCK part, a uSID 2, and a uSID 3, and a structure of the packet is shown in FIG. 11. If the network device 1 determines that the part following the BLOCK part in the DA field is not padded with all zeros, the network device 1 continues to forward the packet. In this case, content in the DA field successfully matches an SID of the network device 2 according to a longest match rule. In other words, a part including the BLOCK part and the uSID 2 successfully matches the SID of the network device 2. In this case, the network device 1 sends the packet to the network device 2.

After the packet arrives at the network device 2, the network device 2 queries a local segment identifier table based on the DA field in the packet according to the longest match rule, and performs a corresponding packet processing action if the part including the BLOCK part and the uSID 2 is successfully matched. In addition, when updating the DA field, the network device 2 deletes the uSID 2 from the DA field, moves a remaining part forward, and pads a blank part at the end with all zeros. In this case, the DA field includes the BLOCK part and the uSID 3, and a structure of the packet is shown in FIG. 12. If the network device 2 determines that the part following the BLOCK part in the DA field is not padded with all zeros, the network device 2 continues to forward the packet. In this case, content in the DA field successfully matches an SID of the network device 3 according to a longest match rule. In other words, a part including the BLOCK part and the uSID 3 successfully matches the SID of the network device 3. In this case, the network device 2 sends the packet to the network device 3.

The network device 3 receives the packet. Optionally, after updating the DA field, the network device 3 further determines whether there is still a remaining identifier following the BLOCK part in the DA field. If there is no remaining identifier, for example, a part following the BLOCK part is all zeros, the network device 3 needs to continue to copy an identifier to the DA field. A network device that performs the copy action may be referred to as a copy node. In other words, the network device 3 is the copy node.

The copy node determines a location of the first identifier in the first element based on a value of a first pointer. The first pointer is a PI pointer, and the first identifier is a currently to-be-added identifier. Optionally, before determining the currently to-be-added identifier based on the value of the PI pointer, the network device 3 first determines a current element based on a value of an SL pointer. The network device 3 further determines the currently to-be-added identifier in the current element based on the value of the PI pointer. The currently to-be-added identifier is determined based on the value of the PI pointer. The currently to-be-added identifier is the first identifier.

An example is used for description with reference to the application scenario shown in FIG. 1. The network device 3 queries a local segment identifier table based on a DA field in a packet according to a longest match rule, and performs a corresponding forwarding action if a part including a BLOCK part and a uSID 3 is successfully matched. In addition, when updating the DA field, the network device 3 deletes the uSID 3 from the DA field, moves a remaining part forward, and pads a blank part at the end with all zeros. In this case, the DA field includes only the BLOCK part. If the network device 3 determines that a part following the BLOCK part in the DA field is all zeros, the network device 3 needs to add a uSID to the DA field. In this case, the network device 3 determines a current element based on a value of an SL pointer. For example, the value of the SL pointer in the packet may be 4. In this case, the network device 3 determines that the current element is the $1^{st}$ element in the segment list. Further, the network device 3 determines, based on a fact that a value of a PI pointer is 3, that a currently to-be-added identifier is the fourth uSID in the current element, namely, a uSID 4.

The copying node copies at least one identifier starting from the first identifier to a packet header of the first packet. Optionally, when the at least one identifier starting from the first identifier may be at least one uSID, the packet header may be an IPv6 packet header. The copy node determines a quantity of the at least one uSID.

Optionally, the copy node determines an integer part of $(128-L_{BLOCK})/L_{uSID}$, and uses a value of the integer part as the quantity of the at least one uSID.

Optionally, the copy node compares an integer part of $(128-L_{BLOCK})/L_{uSID}$ with a quantity of remaining uSIDs that are not added to the DA field in the current element, and uses a smaller value in the integer part and the quantity as the quantity of the at least one uSID.

Optionally, after adding the at least one uSID to the DA field, the copy node modifies the value of the PI pointer in the packet, so that the modified value of the PI pointer points to the currently to-be-added identifier in the segment list. The currently to-be-added identifier may be referred to as a third identifier, and the third identifier may be a next identifier of the last uSID in the at least one uSID in the segment list.

Optionally, the to-be-added identifier may be a uSID, and the uSID is located in a next element of the current element in the segment list. To be specific, all uSIDs in the current element are added to the DA field. In this case, the uSID may be the first uSID in the next element. In this case, the modified value of the PI pointer is used to indicate a location of the uSID in the next element. For example, the modified value of the PI pointer may be 0.

Optionally, after all identifiers in the current element are added to the DA field, the copy node modifies the value of the SL pointer in the packet, so that the modified value of the SL pointer points to a next element of the current element in the segment list.

An example is used for description with reference to the application scenario shown in FIG. 1. The network device 3 determines that a currently to-be-added identifier is a uSID 4. In addition, the network device 3 determines that a quantity of remaining uSIDs that are not added to a DA field in a current element is 1. In other words, there is only the uSID 4. A length of the uSID is 32 bits, a length of a BLOCK part is 32 bits, and an integer part of $(128-L_{BLOCK})/L_{uSID}$ is 3 and is greater than the quantity of remaining uSIDs. Therefore, the network device 3 determines that a quantity of at least one uSID to be added to the DA field is 1. The network device 3 adds the uSID 4 to the DA field in an IPv6 packet header of the packet. In this case, a structure of the packet is shown in FIG. 14. In addition, because all uSIDs in the current element are added to the DA field, the network device 3 modifies a value of an SL pointer in the packet, and subtracts 1 from the value of the SL pointer. The modified value of the SL pointer is 3 to point to the $2^{nd}$ element in the segment list. The network device 3 modifies a value of a PI pointer. The modified value of the PI pointer is 0 to point to the first uSID in the $2^{nd}$ element, namely, a uSID 5.

The network device 3 sends the packet. The packet continues to be forwarded along the forwarding path, and the intermediate node on the forwarding path continues to update the DA field in the packet. After the identifier in the DA field is processed, that is, there is no remaining identifier following the BLOCK part in the DA field, the copy node on the forwarding path continues to update the DA field in the packet. For example, after at least one uSID added to the DA field is processed, the copy node continues to add, based on the value of the PI pointer, at least one identifier starting from the currently to-be-added identifier to the DA field in the packet.

Optionally, the at least one identifier starting from the currently to-be-added identifier may be a uSID. In this case, a processing process of the copy node is similar to that described above. Details are not described herein again.

Optionally, the at least one uSID is a plurality of uSIDs. When the at least one uSID is the plurality of uSIDs, the plurality of uSIDs are adjacent to each other in the segment list.

Optionally, after adding the at least one uSID to the DA field, the copy node modifies the value of the PI pointer in the packet, so that the modified value of the PI pointer points to the currently to-be-added identifier. In this case, the currently to-be-added identifier is a next identifier of the last uSID in the at least one uSID in the segment list.

Optionally, the currently to-be-added identifier may be a uSID, and both the uSID and the at least one uSID may be located in the current element. In this case, the modified value of the PI pointer is used to indicate a location of the uSID in the current element.

Optionally, the currently to-be-added identifier may be a uSID, and the uSID is located in a next element of the current element in the segment list. To be specific, all uSIDs in the current element are added to the DA field. In this case, the uSID may be the first uSID in the next element. In this case, the modified value of the PI pointer is used to indicate a location of the uSID in the next element. For example, the modified value of the PI pointer may be 0.

Optionally, after all identifiers in the current element are added to the DA field, the copy node modifies the value of the SL pointer in the packet, so that the modified value of the SL pointer points to a next element of the current element in the segment list.

The network device 4 receives the packet, and processes the packet based on a BLOCK part and a uSID 4 in the DA field. In addition, when updating the DA field, the network device 4 deletes the uSID 4 from the DA field, moves a remaining part forward, and pads a blank part at the end with all zeros. In this case, the DA field includes only the BLOCK part. In this case, the network device 4 is the copy node. If the network device 4 determines that a part following the BLOCK part in the DA field is all zeros, the network device 4 continues to add an identifier to the DA field in the packet. The network device 4 determines, based on the value of the SL pointer in the packet, that the current element is the $2^{nd}$ element in the segment list, and determines, based on the value of the PI pointer, that the currently to-be-added identifier is the first uSID in the $2^{nd}$ element, namely, a uSID 5. The network device 4 determines that an integer part of $(128-L_{BLOCK})/L_{uSID}$ is 3, determines that a quantity of remaining uSIDs that are not added to the DA field in the current element is 4, and uses a smaller value in the integer part and the quantity, namely, 3, as a quantity of uSIDs added to the DA field. Therefore, the network device 4 adds three uSIDs starting from the uSID 5 to the DA field. The three uSIDs are the uSID 5, a uSID 6, and a uSID 7. In this case, a structure of the packet is shown in FIG. 15. In addition, the network device 4 modifies the value of the PI pointer, so that the value of the PI pointer points to a to-be-added uSID, namely, a uSID 8.

Subsequently, the packet continues to be forwarded to the network device 8 through the network device 5, the network device 6, and the network device 7. Packet processing actions of these network devices are respectively similar to those of the network device 1, the network device 2, the network device 3, and the network device 4. The network device 7 is also the copy node. Details are not described herein again.

Optionally, the at least one identifier starting from the currently to-be-added identifier may be an SID whose length is 128 bits. With reference to the foregoing descriptions, in this case, the last uSID before the SID in the segment list includes a prompt flag. When processing the uSID before the SID, the copy node can determine, based on the prompt flag, that a next identifier of the uSID is an SID whose length is 128 bits. Optionally, the copy node adds an SID whose length is 128 bits to the DA field in the packet. To be specific, the BLOCK part in the DA field is also overwritten.

Optionally, after adding the at least one uSID to the DA field, the copy node modifies the value of the PI pointer in the packet, so that the modified value of the PI pointer points to the currently to-be-added identifier. In this case, the currently to-be-added identifier is a next identifier of the last uSID in the at least one uSID in the segment list.

Optionally, the currently to-be-added identifier may be an SID whose length is 128 bits. In this case, the SID occupies all space in an element, for example, the modified value of the PI pointer may be 0.

For example, the network device 8 is also the copy node. The network device 8 receives the packet, processes the packet based on a part including a BLOCK part and a uSID 8 in the DA field, finds that the uSID 8 includes a prompt flag, and determines that a next identifier of the uSID 8 in the segment list is an SID whose length is 128 bits. The network device 8 determines, based on the value of the SL pointer in the packet, that the current element is the third element in the segment list, and adds an SID in the element to the DA field, that is, adds an SID 9 to the DA field. In this case, a structure of the packet is shown in FIG. 16.

With reference to the foregoing descriptions, the packet may include only an XL pointer. Optionally, when the packet includes only the XL pointer, the network device S, used as the ingress node on the forwarding path of the packet, adds at least one identifier to the DA field, where the identifier may be a uSID. The copy node determines a location of a first identifier in the segment list based on a value of the XL pointer, and copies at least one identifier starting from the first identifier to a packet header of the first packet. Specifically, the copy node adds the at least one identifier starting from the first identifier to the DA field. The copying node modifies the value of the XL pointer in the packet, so that the modified value of the XL pointer still points to the currently to-be-added identifier in the segment list. Optionally, when the packet includes only the XL pointer, the at least one identifier starting from the first identifier is one identifier, namely, the first identifier. In other words, a quantity of identifiers to be added to the DA field each time may be 1. In this case, a location to which the XL pointer points in the segment list is offset by a length of one identifier each time.

When the packet includes only the XL pointer, an example is used for description with reference to the application scenario shown in FIG. 1. For example, the network device S adds a BLOCK part in an SID to a DA field, and adds one uSID following the BLOCK part in the DA field, namely, a uSID 1. The value of the XL pointer may be modified before or after the uSID is added. For example, when the value of the XL pointer is modified after the uSID is added, the network device S sets the XL pointer in the packet to point to a uSID 2, to indicate that a currently to-be-added identifier is the uSID 2 in the segment list. The network device S queries a local routing table based on content in the DA field in the packet header of the packet according to a longest match rule. Specifically, a part including the BLOCK part and the uSID 1 is A:1:01:11, matches an entry in the routing table, and successfully matches the SID 1. To be specific, the network device S determines that a next-hop network device is the network device 1, to send a packet including a segment list to the network device 1. The network device 1 queries a local segment identifier table based on a DA field in the packet according to a longest match rule. If a part including a BLOCK part and a uSID 1 successfully matches an entry in the local segment identifier table, the network device 1 performs a packet processing action corresponding to the uSID 1. When at least one identifier starting from the first identifier is one identifier, a network device corresponding to each identifier in the segment list is a copy node. In other words, the network device 1 is also the copy node. The network device 1 determines a location of a currently to-be-added uSID 2 in the segment list based on the value of the XL pointer, and copies the uSID 2 to the DA field. The network device 1 modifies the value of the XL pointer in the packet, so that the modified value of the XL pointer points to a uSID 3, to indicate that a currently to-be-added identifier is the uSID 3 in the segment list. Subsequently, the packet continues to be forwarded to the network device 10 through the network device 3, the network device 4, the network device 5, the network device 6, the network device 7, the network device 8, and the network device 9. Packet processing actions of these network devices each are similar to that of the network device 1. Details are not described herein again.

Optionally, the segment list may include both the uSID and an identifier of another type. The identifier of another type may be an MPLS label or an IPv4 address. To be specific, the MPLS label or the IPv4 address may be further included in the segment list in which the uSID is used. Among all network devices through which the packet passes, a network device may not support SRv6, but can support MPLS or IPv4. In this case, an MPLS label or an IPv4 address corresponding to the network device is directly stored in the segment list, to improve network compatibility and network efficiency. With reference to the application scenario shown in FIG. 1, the network device S sends a packet to the network device 10. In this case, a forwarding path of the packet is: the network device S->the network device 1->the network device 2->the network device 3->the network device 4->the network device 5->the network device 6->the network device 7->the network device 8->the network device 9->the network device 10. The network device 3, the network device 4, the network device 5, and the network device 6 do not support SRv6, but can support MPLS.

In the segment list, the uSID, and the MPLS label and/or the IPv4 address are sequentially arranged based on a sequence of corresponding network devices on the forwarding path. A length of each MPLS label may be 32 bits, and a length of each IPv4 address may also be 32 bits. The length of the MPLS label or the IPv4 address may be the same as or different from a length of the uSID. FIG. 8 shows a structure of the segment list in this case. Because the network device 3, the network device 4, the network device 5, and the network device 6 do not support SRv6, but can support MPLS, MPLS labels respectively corresponding to these network devices, namely, M3, M4, M5, and M6, may be stored in the segment list. A uSID or an SID corresponding to another network device is also stored in the segment list. The length of the MPLS label is 32 bits, and is the same as the length of the uSID. In addition, these MPLS labels and the uSID may be jointly stored in one element. As shown in FIG. 8, in the segment list, the $1^{st}$ element stores a uSID 1, a uSID 2, M3, and M4, and the 2nd element stores M5, M6, a uSID 7, and a uSID 8. A storage manner of the IPv4 address is similar to that of the MPLS label. Details are not described herein again.

Optionally, when the segment list includes an MPLS label and/or an IPv4 address, the network device S adds a switching flag to the packet, where the switching flag may be located in the segment list. For example, when the segment list includes a plurality of consecutively arranged MPLS labels or IPv4 addresses, the switching flag may be located in a specific identifier in the segment list. For example, the specific identifier is referred to as a second identifier. The second identifier may be the last uSID before the first MPLS label or IPv4 address. Alternatively, the switching flag may be an independent identifier, and the independent identifier is added between the last uSID and the first MPLS label or IPv4 address. The switching flag is used to indicate that a next identifier in the segment list is an MPLS label and/or an IPv4 address, so that when reading the last uSID, the network device can determine that the next identifier of the uSID in the segment list is an MPLS label and/or an IPv4 address. A specific process is described in detail below.

Optionally, when the network device S adds at least one identifier to the DA field, the network device S determines whether each of the at least one to-be-added identifier includes the switching flag. If an identifier includes the switching flag, the network device S no longer adds a next identifier of the identifier to the DA field after adding the identifier to the DA field. In this case, the at least one identifier to be added to the DA field is all uSIDs, and does not include an identifier of another type.

Optionally, when the segment list includes an MPLS label and/or an IPv4 address, the network device S further adds a quantity flag to the packet, where a value of the quantity flag is used to indicate a quantity of MPLS labels and/or IPv4 addresses in the segment list. The quantity flag may be located in a packet header, and the packet header may be an SRH or an IPv6 packet header. For example, the quantity flag may be located in a specific field in the SRH, or the quantity flag may be located in a DA field in the IPv6 packet header. The quantity flag may alternatively be located in the segment list. For example, when the segment list includes a plurality of consecutively arranged MPLS labels or IPv4 addresses, the quantity flag may be located in the last uSID before the first MPLS label or IPv4 address. In this case, the PI pointer is used to indicate locations of different uSIDs, MPLS labels, or IPv4 addresses in the element.

Optionally, the switching flag and the quantity flag may be a same flag. To be specific, the quantity flag also plays a function of the switching flag. In this case, when the segment list includes a plurality of consecutively arranged MPLS labels or IPv4 addresses, the quantity flag may be located in the last uSID before the first MPLS label or IPv4 address.

An example is used for description with reference to FIG. 10. FIG. 10 shows a structure of a packet to which a segment list and a PI pointer are added. The segment list includes an MPLS label. In addition, the network device S adds a BLOCK part in an SID to a DA field, and adds two uSIDs and one MPLS label following the BLOCK part in the DA field. As shown in FIG. 10, the two uSIDs are a uSID 1 and a uSID 2, and the one MPLS label is M3. When a value of the PI pointer is 3, it indicates that the first three identifiers in the element in the segment list are added to the DA field. A to-be-added identifier, namely, M3, in the element can be determined based on the value of the PI pointer. Specific content is described in detail below.

When the segment list in the packet further includes an identifier of another type, for example, an MPLS label and/or an IPv4 address, an intermediate node on the forwarding path may copy the identifier of another type to a forwarding identifier stack in the packet. The forwarding identifier stack is used to guide packet forwarding. The intermediate node that executes the copy behavior may be referred to as a copy node.

Optionally, when processing a current uSID, the copy node on the forwarding path can determine, by using the switching flag or the quantity flag, that the next identifier in the segment list includes the MPLS label or the IPv4 address. In this case, the currently to-be-added identifier needs to be the first MPLS label or IPv4 address. The copy node determines the first MPLS label or IPv4 address based on the value of the PI pointer.

If the current uSID is the last uSID in the DA field, that is, there is no other identifier following the uSID in the DA field, the copy node may directly determine the first MPLS label or IPv4 address in the segment list based on the value of the PI pointer.

If the current uSID is not the last uSID in the DA field, that is, there is another identifier following the uSID in the DA field, it indicates that some MPLS labels or IPv4 addresses are added to the DA field, and the first MPLS label or IPv4 address is added to the DA field. Optionally, the copy node may separately obtain another identifier that is added to the DA field and another identifier that is not added to the DA field. Optionally, the copy node may alternatively determine a quantity N of MPLS labels or IPv4 addresses that is added to the DA field, where N is an integer, then correct the value of the PI pointer based on the value of the PI pointer and the quantity N, and determine the first MPLS label or IPv4 address in the segment list based on the corrected value of the PI pointer. Specifically, the copy node corrects the value of the PI pointer by subtracting a value of the quantity N from the value of the PI pointer. The foregoing process may also be considered as rollback of the PI pointer in the segment list.

Referring to a structure of a packet shown in FIG. 13, a DA field in the packet includes a BLOCK part, a uSID 2, and M3, the uSID 2 includes a quantity flag, and a value of the quantity flag may be 4. In addition, a value of a PI pointer in the packet may be 3. An example is used for description with reference to the application scenario shown in FIG. 1. The copy node may be the network device 2. The network device 2 queries a local segment identifier table based on a DA field in a packet according to a longest match rule, and performs a corresponding forwarding action if a part including a BLOCK part and a uSID 2 is successfully matched. In addition, when processing the current uSID 2, the network device 2 determines, based on a quantity flag included in the uSID 2, that the uSID 2 includes an MPLS label in a next identifier in the segment list, where a quantity of MPLS labels is 4. In this case, the currently to-be-added identifier needs to be the first MPLS label.

The network device 2 further determines that the current uSID 2 is not the last uSID in the DA field. There are 32 non-zero bits following the uSID 2 in the DA field, and there is one MPLS label following the uSID 2. In other words, the first MPLS label is added to the DA field. The network device 2 determines, based on a fact that the value of the PI pointer is 3 with reference to a fact that a quantity of MPLS labels that are added to the DA field is 1, that the corrected value of the PI pointer needs to be 2, and determines, based on the corrected value of the PI pointer, that the first MPLS label needs to be the $3^{rd}$ identifier in the current element, namely, M3.

Optionally, when at least one identifier starting from the first identifier is at least one identifier of another type, for example, an MPLS label or an IPv4 address, the copy node adds the identifier of another type to the second packet header to form a forwarding identifier stack, for example, an MPLS label stack or an IPv4 address stack.

With reference to the foregoing descriptions, when some identifiers of another type are added to the DA field, optionally, the copy node may separately obtain the another identifier that is added to the DA field and the another identifier that is not added to the DA field, and jointly add the two identifiers to the second packet header to form a forwarding identifier stack. Optionally, the copy node may alternatively determine a location of the first identifier of another type in the segment list based on the corrected value of the PI pointer, to obtain all identifiers of another type from the segment list.

The copy node determines a quantity of the at least one MPLS label or IPv4 address. Optionally, the intermediate node uses the value of the quantity flag as the quantity of the at least one MPLS label or IPv4 address.

The at least one MPLS label or IPv4 address corresponds to at least one network device that supports MPLS or IPv4. After passing through the network device, the packet may enter an SRv6 network again. In this case, in the segment list, there are one or more uSIDs following the at least one MPLS label or IPv4 address, and these uSIDs also need to be copied to the DA field in the IPv6 packet header of the packet. Optionally, these uSIDs may be copied by the intermediate node to the DA field. Optionally, these uSIDs may alternatively be copied to the DA field by the last network device in the at least one network device that supports MPLS or IPv4.

When these uSIDs may be copied by the intermediate node to the DA field, optionally, after copying these uSIDs to the DA field, the copy node modifies the value of the PI pointer in the packet, so that the modified value of the PI pointer points to another identifier in the segment list. For example, the another identifier may be referred to as a third identifier. The third identifier may be a next identifier of the last uSID in these uSIDs copied to the DA field in the segment list. The third identifier and the last uSID may be located in a same element in the segment list, or the third identifier and the last uSID may be located in different elements in the segment list. For example, when an element in which the last uSID is located is a first element, and an element in which the third identifier is located is a second element, the first element may be the same as or different from the second element. Optionally, when the first element is different from the second element, the copy node further modifies the value of the SL pointer in the packet, so that the modified value of the SL pointer points to the second element. For example, the second element may be a next element of the first element in the segment list.

Figure 17:
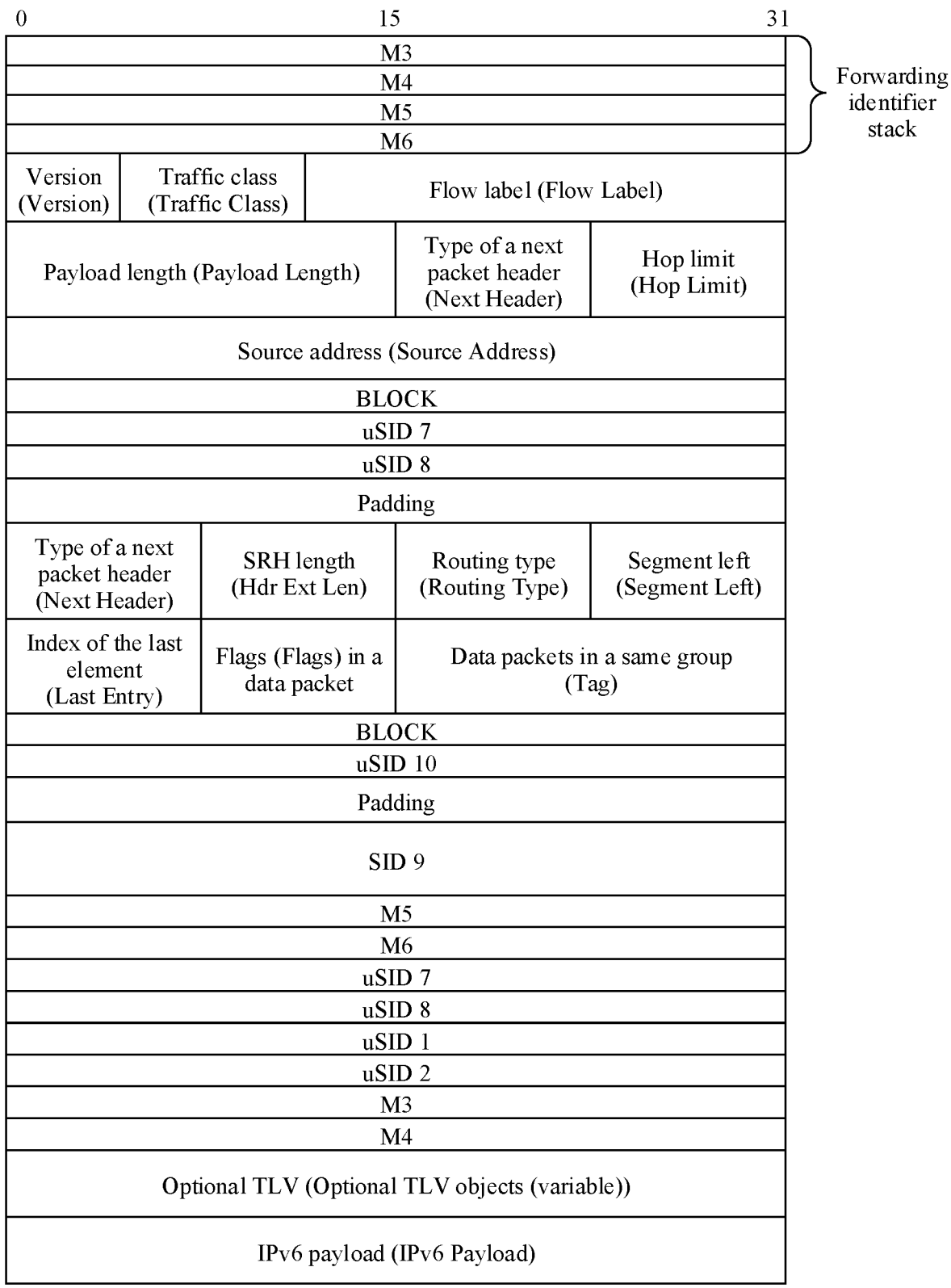
FIG. 17 is a schematic structural diagram of a packet according to an embodiment of this disclosure.

An example is used for description with reference to the application scenario shown in FIG. 1. The copy node may be the network device 2. A structure of a packet received by the network device 2 is shown in FIG. 13. The network device 2 determines that the first MPLS label needs to be the $3^{rd}$ identifier in the current element, namely, M3. In addition, the network device 2 determines, based on a fact that the value of the quantity flag is 4, that a quantity of the at least one MPLS label to be added to the DA field is 4. The network device 2 establishes an MPLS packet header outside the IPv6 packet header of the packet. The MPLS packet header includes a forwarding identifier stack, namely, an MPLS label stack. The network device 2 adds four MPLS labels starting from M3 to the MPLS label stack. The four MPLS labels include M3, M4, M5, and M6. In addition, the network device 2 copies at least one uSID following M6 in the segment list to the DA field. Specifically, the network device 2 copies the uSID 7 and the uSID 8 to the DA field. In addition, the network device 2 modifies the value of the SL pointer, so that the modified value of the SL pointer is 2, to point to the third element in the segment list. The network device 2 modifies the value of the PI pointer, so that the modified value of the PI pointer is 0, to point to the $1^{st}$ identifier in the third element, namely, an SID 9. In this case, a structure of the packet is shown in FIG. 17.

The network device 2 forwards the packet to the network device 3 based on a topmost label in the MPLS label stack in the MPLS packet header, namely, M3. When the packet arrives at the network device 3, M3 at the top of the MPLS label stack is popped out, and M4 becomes a topmost label. The network device 3 forwards the packet to the network device 4 based on M4. Subsequently, the packet sequentially arrives at the network device 4, the network device 5, and the network device 6. A specific process is similar to that in the foregoing descriptions. Details are not described herein again. At the network device 5 or the network device 6, the MPLS packet header of the packet is removed. The network device 6 supports both MPLS and SRv6. The network device 6 continues to forward the packet based on the DA field in the IPv6 packet header of the packet. Referring to the structure of the packet shown in FIG. 17, the DA field includes a BLOCK part, a uSID 7, and a uSID 8. Therefore, the network device 6 forwards the packet to the network device 7. A specific process is similar to that in the foregoing descriptions. Details are not described herein again.

A process of processing the MPLS label is used as an example for description. A process of processing the IPv4 address is similar to that in the foregoing descriptions. Details are not described herein again.

An embodiment of the present invention provides a method for forwarding a packet.

Figure 18:
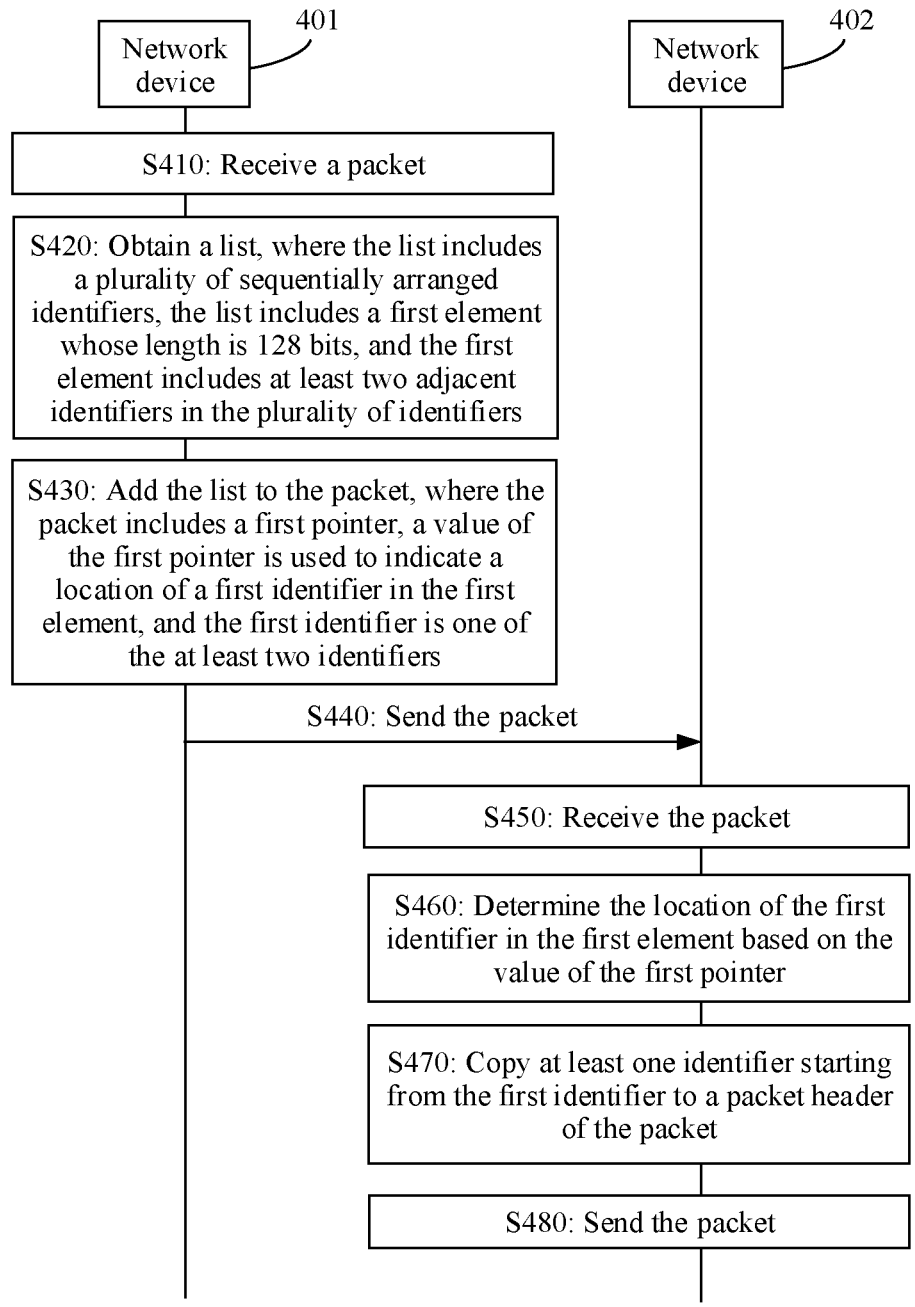
FIG. 18 is a flowchart of a packet processing method according to an embodiment of this disclosure.

FIG. 18 is a method flowchart of the method. The method is applied to a network device 401 and a network device 402. The network device 401 may be a network ingress device in a network, and is configured to encapsulate a segment list corresponding to a forwarding path of the packet in the packet, for example, the network device S shown in FIG. 1. The network device 402 may be a forwarding device in the network. Specifically, the network device 402 is the copy node in the foregoing embodiment, for example, the network device 3, the network device 4, the network device 7, the network device 8, or the network device 9 shown in FIG. 1, or the network device 2 shown in FIG. 1. The method includes the following steps.

S410: The network device 401 receives a packet.

S420: The network device 401 obtains a segment list. The segment list corresponds to a forwarding path of the first packet, the forwarding path includes a plurality of network devices, the segment list includes a plurality of sequentially arranged identifiers, an identifier in the plurality of identifiers corresponds to one of the plurality of network devices or one link on the forwarding path, the segment list includes an element whose length is 128 bits, and the element includes at least two adjacent identifiers in the plurality of identifiers.

S430: The network device 401 adds the segment list to the packet, where the segment list includes a first pointer, a value of the first pointer is used to indicate a location of a first identifier in the element, and the first identifier is one of the at least two identifiers.

S440: The network device 401 sends the packet.

The network device 401 may be a network ingress device in a network, and the network device 401 is an ingress node on the forwarding path of the packet, for example, the network device S shown in FIG. 1. For a specific process, refer to the descriptions of the network device S in the foregoing embodiment. Similar content is not described herein again.

S450: The network device 402 receives the packet. A packet hearer of the packet includes a segment list used to forward the packet, the segment list includes a plurality of sequentially arranged identifiers, each of the plurality of identifiers corresponds to one network device or one link, the segment list includes a first element whose length is 128 bits, the first element includes at least two adjacent identifiers in the plurality of identifiers, and the first packet includes a first pointer.

S460: The network device 402 determines a location of the first identifier in the first element based on a value of the first pointer.

S470: The network device 402 copies at least one identifier starting from the first identifier to the packet header of the packet.

S480: The network device 402 sends the packet.

The network device 402 may be a copy node on the forwarding path of the packet. In other words, the network device 402 is an intermediate node that copies the at least one identifier to the packet. The at least one identifier copied by the network device 402 may be a uSID, an MPLS label, or an IPv4 address. Specifically, with reference to the application scenario shown in FIG. 1, the network device 402 may be the network device 2, the network device 3, the network device 4, the network device 7, the network device 8, or the network device 9 in FIG. 1. For a specific process, refer to the descriptions of the network device 2, the network device 3, the network device 4, the network device 7, the network device 8, or the network device 9 in the foregoing embodiment. Similar content is not described herein again.

In an actual network, the forwarding path of the packet may be generated by a controller, or may be generated by the ingress node on the forwarding path. When the controller generates the forwarding path of the packet, the controller also generates a segment list corresponding to the forwarding path, where the segment list may be a segment list including a uSID. The controller sends the segment list to the ingress node on the forwarding path. After receiving the packet, the ingress node on the forwarding path determines the forwarding path of the packet from several forwarding paths stored in the device, and determines the segment list corresponding to the forwarding path; and encapsulates the segment list in the packet, to forward the packet.

Figure 19:
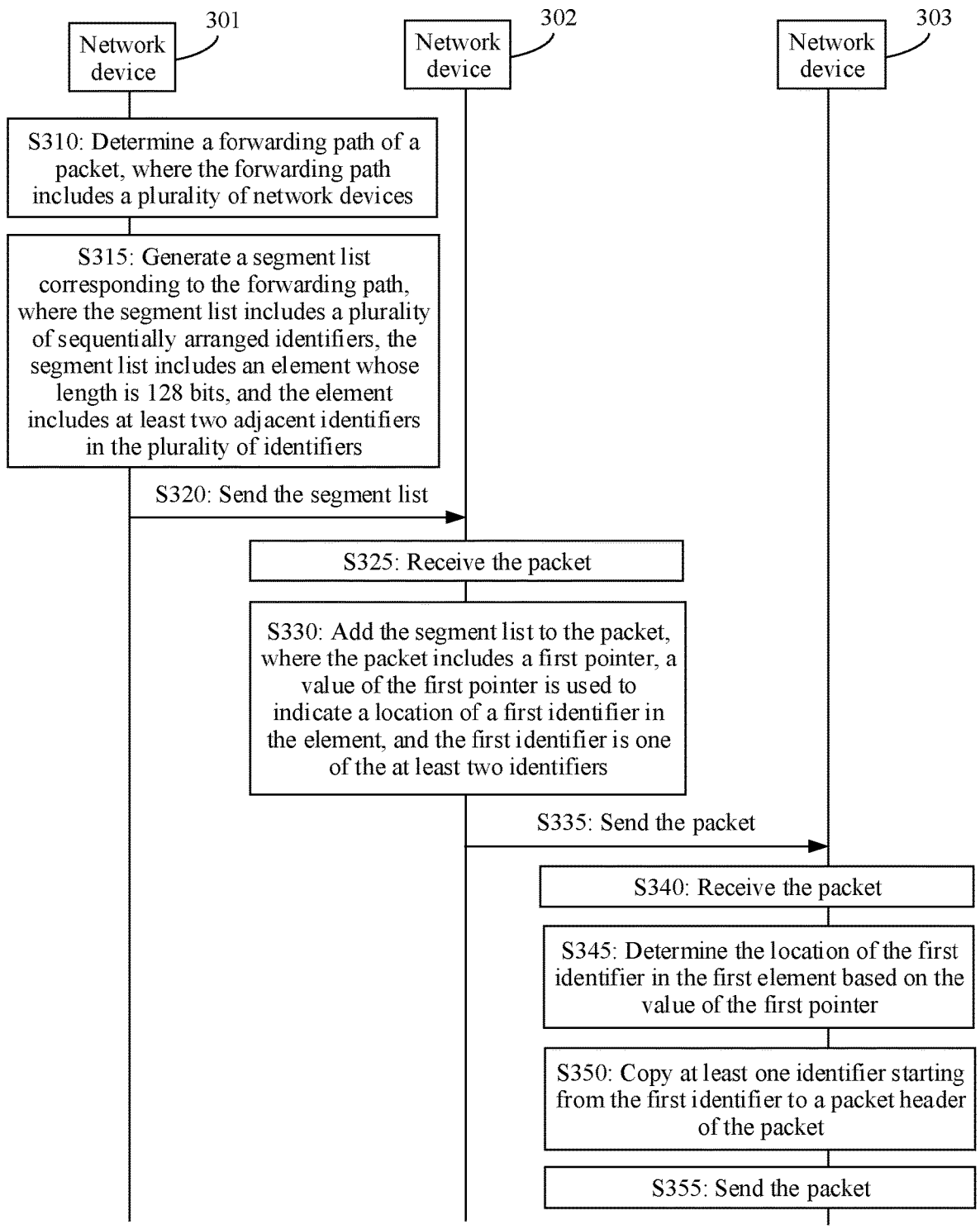
FIG. 19 is a flowchart of a packet processing method according to an embodiment of this disclosure.

An embodiment of the present invention provides a method for forwarding a packet. FIG. 19 is a method flowchart of the method. The method is applied to a network device 301, a network device 302, and a network device 303. The network device 301 may be a controller in a network, and is configured to: calculate a forwarding path of the packet, and generate a segment list corresponding to the forwarding path. The network device 302 may be a network ingress device, and is configured to encapsulate the segment list in the packet, for example, the network device S shown in FIG. 1. The network device 303 may be a forwarding device in the network, and is configured to forward the packet based on the segment list. Specifically, the network device 303 may be the copy node in the foregoing embodiment, for example, the network device 2, the network device 3, the network device 4, the network device 7, the network device 8, or the network device 9 shown in FIG. 1. The method includes the following steps.

S310: The network device 301 determines a forwarding path of a packet, where the forwarding path includes a plurality of network devices.

The network device 301 may be a controller in a network. The controller calculates the forwarding path used to forward the packet.

S315: The network device 301 generates the segment list corresponding to the forwarding path, where the segment list includes the plurality of sequentially arranged identifiers, each of the plurality of identifiers corresponds to one of the plurality of network devices or one link on the forwarding path, the segment list includes a first element whose length is 128 bits, and the first element includes at least two adjacent identifiers in the plurality of identifiers.

Optionally, the network device 301 obtains a plurality of segment identifiers, where the plurality of segment identifiers correspond to at least one of the plurality of network devices or at least one link on the forwarding path. For example, the controller obtains an SID of each network device on the forwarding path. The network device 301 obtains a plurality of identifiers based on the plurality of segment identifiers, where the plurality of identifiers are mapped to the plurality of segment identifiers in a one-to-one manner. To reduce a length of the SID, the controller may convert a plurality of SIDs into a plurality of uSIDs, where the plurality of uSIDs are mapped to the plurality of SIDs in a one-to-one manner. A specific method includes: omitting a BLOCK part in the SID and/or setting a function field in the SID to a compressed format. For a specific process, refer to the descriptions of step S420. Similar content is not described herein again.

The network device 301 generates the segment list corresponding to the forwarding path, where the segment list includes the plurality of sequentially arranged identifiers, the segment list includes an element whose length is 128 bits, and the element includes at least two adjacent identifiers in the plurality of identifiers. For example, the controller replaces the plurality of SIDs with the plurality of uSIDs, and places the plurality of uSIDs in the segment list, to reduce a length of the segment list. Space in the segment list may be divided into a plurality of elements, and a length of each element may be 128 bits. At least two uSIDs may be stored in each element. For a specific process, refer to the descriptions of step S420. Similar content is not described herein again.

S320: The network device 301 sends the segment list to the network device 302.

The network device 302 is a network device in a network, and the network device 302 is an ingress node on the forwarding path of the packet, for example, the network device S shown in FIG. 1. The network device 302 obtains the segment list, where the segment list corresponds to the forwarding path of the packet, the segment list includes the plurality of sequentially arranged identifiers, and each of the plurality of identifiers corresponds to one of the plurality of network devices.

S325: The network device 302 receives the packet.

As the ingress node on the forwarding path, the network device 302 receives the packet, and determines the forwarding path of the packet. Optionally, the network device 302 may find, from a plurality of stored forwarding paths, a forwarding path used to forward the packet, to determine the forwarding path of the packet. The plurality of stored forwarding paths may be received by the network device 302 from the controller.

S330: The network device 302 adds the segment list to the packet, where the segment list includes the first pointer, a value of the first pointer is used to indicate a location of a first identifier in the element, and the first identifier is one of the at least two identifiers.

For a specific process of step S330, refer to the descriptions of step S430. Similar content is not described again.

S335: The network device 302 sends the packet.

For a specific process of step S335, refer to the descriptions of step S440. Similar content is not described again.

S340: The network device 303 receives the packet.

For a specific process of step S340, refer to the descriptions of step S450. Similar content is not described again.

S345: The network device 303 determines a location of the first identifier in the first element based on a value of the first pointer. The first pointer is the newly added PI pointer described above.

For a specific process of step S345, refer to the descriptions of step S460. Similar content is not described again.

S350: The network device 303 copies at least one identifier starting from the first identifier to the packet header of the packet.

For a specific process of step S350, refer to the descriptions of step S470. Similar content is not described again.

S355: The network device 303 sends the packet.

For a specific process of step S355, refer to the descriptions of step S480. Similar content is not described again.

Figure 20:
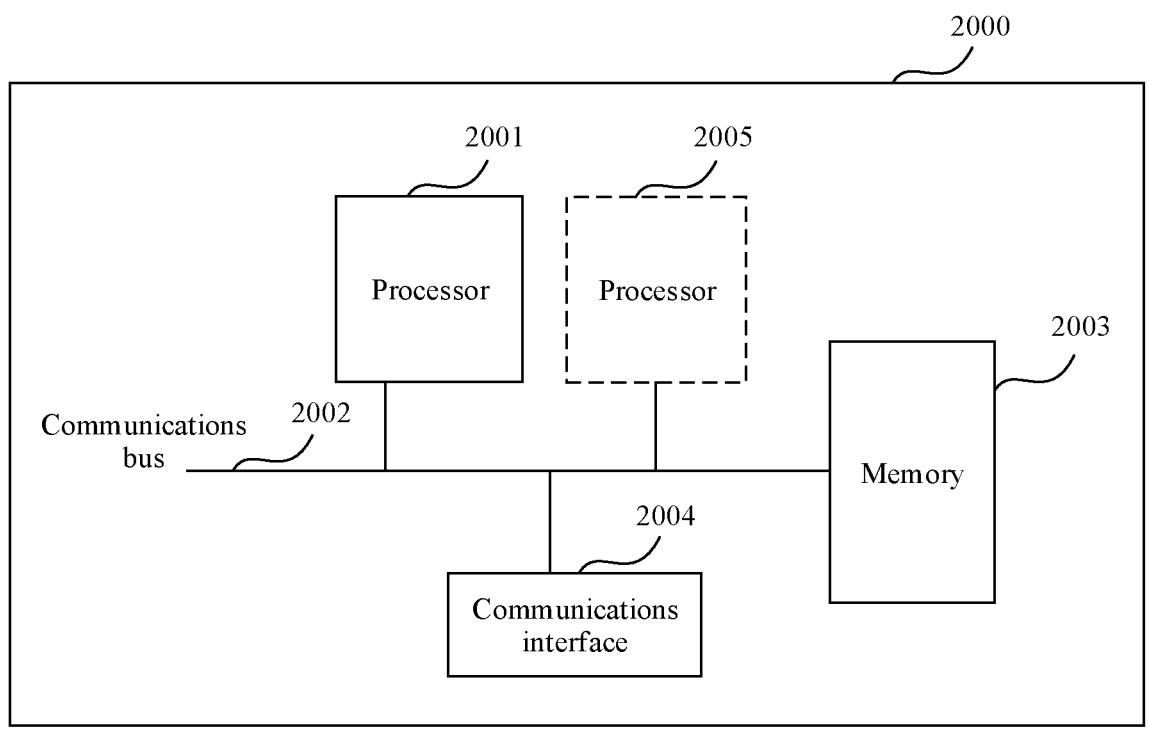
FIG. 20 is a schematic structural diagram of a network device according to an embodiment of this disclosure.

FIG. 20 is a schematic structural diagram of a device 400 according to an embodiment of this disclosure. Any network device in FIG. 1 may be implemented by using the device shown in FIG. 20. The network device 401 and the network device 402 in the embodiment shown in FIG. 18, and the network device 301, the network device 302, and the network device 303 in the embodiment shown in FIG. 19 may be implemented by using the device shown in FIG. 20. Referring to FIG. 20, the device 2000 includes at least one processor 2001, a communications bus 2002, and at least one communications interface 2004. Optionally, the device 2000 may further include a memory 2003.

The processor 2001 may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor 2001 may implement or execute various logical blocks, modules, and circuits described with reference to content disclosed in the embodiments of the present invention. Alternatively, the processor may be a combination of processors implementing a computing function, for example, a combination of one or more microprocessors, or a combination of a DSP and a microprocessor. The processor may be configured to: generate a segment list, or process a received packet, and further forward the processed packet through the communications interface, to implement the method provided in the embodiments of this disclosure.

For example, when a controller or a network ingress device in a network is implemented by using the device shown in FIG. 20, the processor may be configured to generate a segment list, so that the network device can forward a corresponding packet based on the segment list. For a specific function implementation, refer to a processing part of the controller or the network ingress device in the method embodiment. For example, when the network ingress device in FIG. 1 is implemented by using the device shown in FIG. 20, the processor may be configured to add a segment list to a received packet, so that the network device can subsequently forward the packet based on the segment list in the packet. For a specific function implementation, refer to a processing part of the network ingress device in the method embodiment. For another example, when the forwarding device in the network in FIG. 1 is implemented by using the device shown in FIG. 20, the processor may be configured to forward a packet based on a segment list in the packet. For a specific function implementation, refer to a processing part of the forwarding device in the method embodiment.

The communications bus 2002 is configured to transmit information between the processor 2001, the communications interface 2004, and the memory 2003. The bus may be a peripheral component interconnect (PCI for short) bus, an extended industry standard architecture (EISA for short) bus, or the like. The bus may be classified into an address bus, a data bus, a control bus, and the like. For ease of representation, only one thick line is used to represent the bus in FIG. 20, but this does not mean that there is only one bus or only one type of bus.

The memory 2003 may be a read-only memory (ROM) or another type of static storage device that can store static information and an instruction, or a random access memory (RAM) or another type of dynamic storage device that can store information and an instruction. The memory 2003 may alternatively be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, the memory 2003 is not limited thereto. The memory 2003 may exist independently, and is connected to the processor 2001 by using the communications bus 2002. Alternatively, the memory 2003 may be integrated into the processor 2001.

Optionally, the memory 2003 is configured to store program code or an instruction for executing the solutions of this disclosure, and the processor 2001 controls execution. The processor 2001 is configured to execute the program code stored in the memory 2003. The program code may include one or more software modules. Optionally, the processor 2001 may also store program code or an instruction for executing the solutions of this disclosure.

The communications interface 2004 is any apparatus such as a transceiver, to communicate with another device or a communications network. The communications network may be the Ethernet, a radio access network (RAN), a wireless local area network (WLAN), or the like. In this embodiment of this disclosure, the communications interface 2004 may be configured to: receive a packet sent by another node in a segment routing network, or send a packet to another node in a segment routing network. The communications interface 2004 may be an Ethernet interface, a fast Ethernet (FE) interface, a gigabit Ethernet (GE) interface, an asynchronous transfer mode (ATM) interface, or the like.

In a specific implementation, in an embodiment, the device 2000 may include a plurality of processors, for example, the processor 2001 and a processor 2005 that are shown in FIG. 20. Each of the processors may be a single-core processor (single-CPU) or a multi-core processor (multi-CPU). The processor herein may be one or more devices, circuits, and/or processing cores configured to process data (for example, a computer program instruction).

Figure 21:
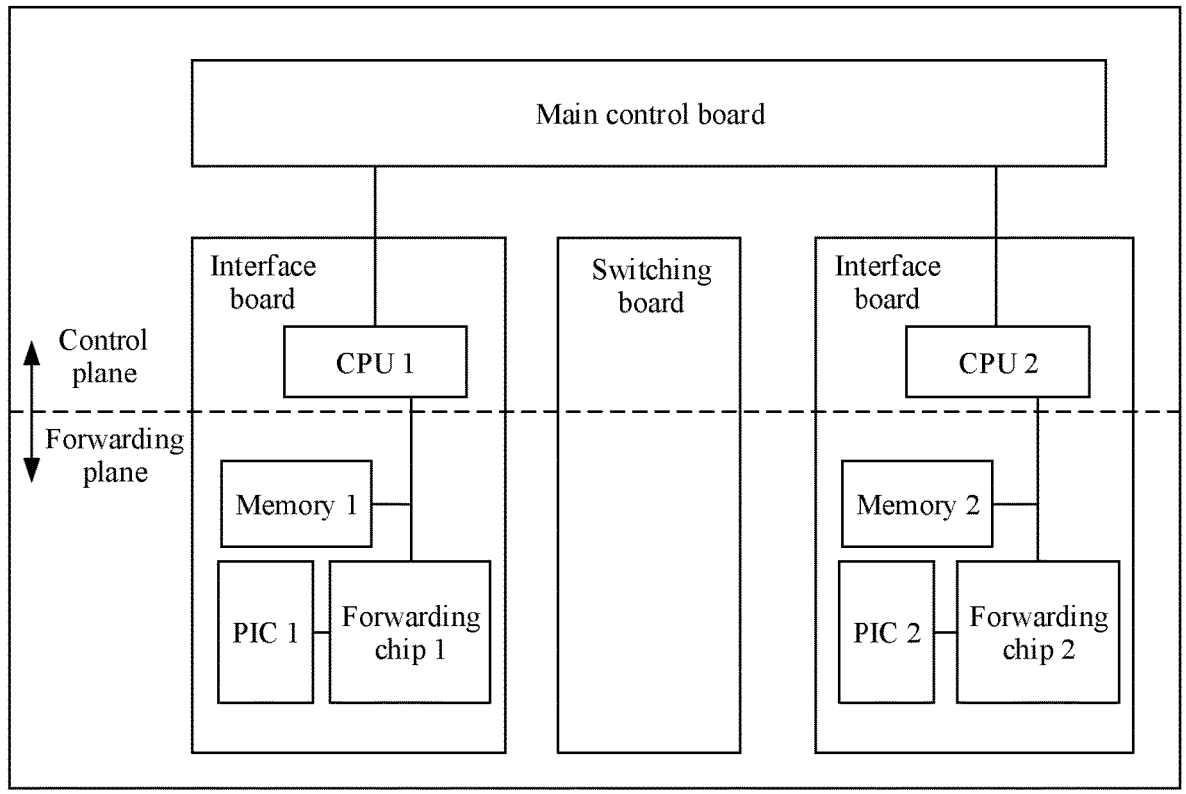
FIG. 21 is a schematic structural diagram of a network device according to an embodiment of this disclosure.

FIG. 21 is a schematic structural diagram of a device 2100 according to an embodiment of this disclosure. Any network device other than the controller in FIG. 1 may be implemented by using the device shown in FIG. 21. The network device 401 and the network device 402 in the embodiment shown in FIG. 18, and the network device 302 and the network device 303 in the embodiment shown in FIG. 19 may be implemented by using the device shown in FIG. 21. For details, refer to the schematic structural diagram of the device shown in FIG. 21. The device 2100 includes a main control board and one or more interface boards. The main control board and the interface boards are communicatively connected. The main control board is also referred to as a main processing unit (MPU) or a route processor card. The main control board is responsible for controlling and managing each component in the device 2100, including route calculation, device management, and function maintenance. The interface board is also referred to as a line processing unit (LPU) or a line card, and is configured to forward data. In some embodiments, the device 2100 may also include a switching board. The switching board is communicatively connected to the main control board and the interface boards. The switching board is configured to forward data between the interface boards. The switching board may also be referred to as a switch fabric unit (SFU). The interface board includes a central processing unit, a memory, a forwarding chip, and a physical interface card (PIC). The central processing unit is separately communicatively connected to the memory, a network processor, and the physical interface card. The memory is configured to store a forwarding table. The forwarding chip is configured to forward a received data frame based on the forwarding table stored in the memory. If a destination address of the data frame is an address of the device 2100, the data frame is sent to the CPU for processing. If a destination address of the data frame is not an address of the device 2100, a next hop and an outbound interface that correspond to the destination address are found in the forwarding table based on the destination address, and the data frame is forwarded to the outbound interface corresponding to the destination address. The forwarding chip may be a network processor (NP). The PIC, also referred to as a subcard, may be installed on the interface board. The PIC is responsible for converting an optical/electrical signal into a data frame, checking validity of the data frame, and forwarding the data frame to the forwarding chip for processing. In some embodiments, the central processing unit may also perform a function of the forwarding chip, for example, implement software forwarding based on a general CPU, so that the interface board does not need the forwarding chip. A communication connection between the main control board, the interface boards, and the switching board may be implemented through the bus. In some embodiments, the forwarding chip may be implemented by using an application-specific integrated circuit (ASIC) or a field programmable gate array (FPGA).

Logically, the device 2100 includes a control plane and a forwarding plane. The control plane includes the main control board and the central processing unit. The forwarding plane includes components for performing forwarding, for example, the memory, the PIC, and the NP. The control plane performs functions such as a function of a router, generating a forwarding table, processing signaling and protocol packets, and configuring and maintaining a status of a PE 1. The control plane delivers the generated forwarding table to the forwarding plane. On the forwarding plane, the NP searches a table based on the forwarding table delivered by the control plane to forward a packet received by the PIC of the device 2100. The forwarding table delivered by the control plane may be stored in the memory. In some embodiments, the control plane and the forwarding plane may be completely separated, and are not on a same device.

Figure 22:
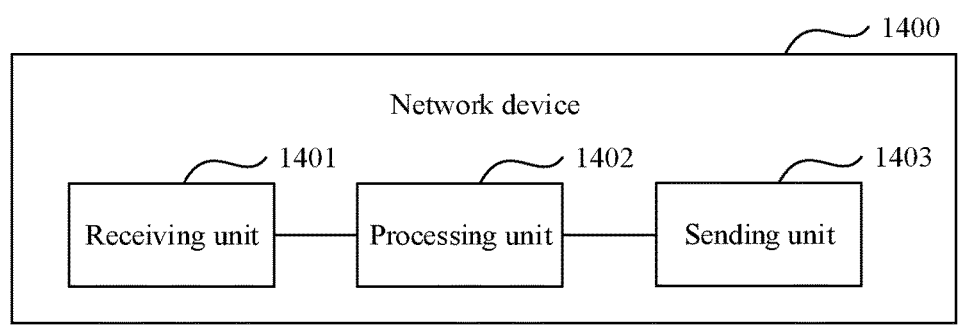
FIG. 22 is a schematic structural diagram of a network device according to an embodiment of this disclosure.

FIG. 22 is an optional schematic structural diagram of the network device in the foregoing embodiments. A network device 1400 may implement a function of the network device 402 or the network device 303 in the foregoing embodiments. Referring to FIG. 20, the network device 1400 includes a receiving unit 1401, a processing unit 1402, and a sending unit 1403. These units may perform a corresponding function of the network device 402 or the network device 303 in the foregoing method. Details are as follows:

The receiving unit 1401 is configured to receive a first packet, where a first packet header of the first packet includes a segment list used to forward the first packet, the segment list includes a plurality of sequentially arranged identifiers, an identifier in the plurality of identifiers corresponds to one network device or one link, the segment list includes a first element whose length is 128 bits, the first element includes at least two adjacent identifiers in the plurality of identifiers, and the first packet includes a first pointer and a second pointer.

The processing unit 1402 is configured to: determine a location of the first element in the segment list based on a value of the second pointer; determine a location of the first identifier in the first element based on a value of the first pointer, where the first identifier is one of the at least two identifiers; and copy at least one identifier starting from the first identifier to a second packet header of the first packet, to generate a second packet.

The sending unit 1403 is configured to send the second packet.

The network device 1400 may alternatively be implemented by using the device shown in FIG. 20. In this case, the network device 1400 includes at least one processor, a communications bus, and at least one communications interface. Optionally, the network device 1400 may further include a memory.

In a specific embodiment, the processor in the network device 1400 is configured to: receive a first packet through the communications interface, where a first packet header of the first packet includes a segment list used to forward the first packet, the segment list includes a plurality of sequentially arranged identifiers, each of the plurality of identifiers corresponds to one network device or one link, the segment list includes a first element whose length is 128 bits, the first element includes at least two adjacent identifiers in the plurality of identifiers, and the first packet includes a first pointer; determine a location of the first identifier in the first element based on a value of the first pointer, where the first identifier is one of the at least two identifiers; copy at least one identifier starting from the first identifier to a second packet header of the first packet, to generate a second packet; and send the second packet through the communications interface 1503. For a detailed processing process of the processor, refer to the detailed descriptions of the processes S450, S460, S470, and S480 and the processes S340, S345, S350, and S355 in the foregoing embodiments. Details are not described herein again.

The communications interface in the network device 1400 is used by the network device 1400 to receive and send a packet by using a network system. For a specific process, refer to the detailed descriptions of S450, S480, S340, and S355 in the foregoing embodiments. Details are not described herein again.

The network device 1400 may alternatively be implemented by using the device shown in FIG. 21. In this case, the network device 1400 includes a main control board and one or more interface boards. The main control board and the interface boards are communicatively connected. For details, refer to the descriptions of the network device 2100 in the foregoing embodiment. The details are not described herein again.

Figure 23:
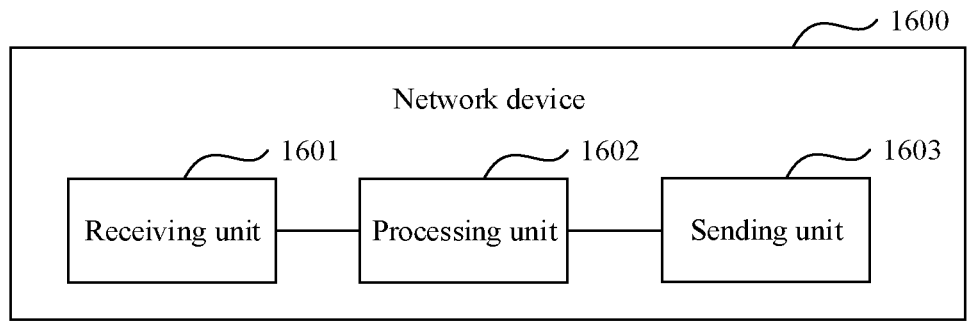
FIG. 23 is a schematic structural diagram of a network device according to an embodiment of this disclosure.

FIG. 23 is an optional schematic structural diagram of the network device in the foregoing embodiments. A network device 1600 may implement a function of the network device 401 or the network device 302 in the foregoing embodiments. Referring to FIG. 23, the network device 1600 includes a receiving unit 1601, a processing unit 1602, and a sending unit 1603. These units may perform a corresponding function of the network device 401 or the network device 302 in the foregoing method. Details are as follows:

The receiving unit 1601 is configured to receive a first packet.

The processing unit 1602 is configured to: obtain a segment list, where the segment list corresponds to a forwarding path of the first packet, the forwarding path includes a plurality of network devices, the segment list includes a plurality of sequentially arranged identifiers, an identifier in the plurality of identifiers corresponds to one of the plurality of network devices or one link on the forwarding path, the segment list includes a first element whose length is 128 bits, and the first element includes at least two adjacent identifiers in the plurality of identifiers; and add the segment list to the first packet to generate a second packet, where the second packet includes a first pointer, a value of the first pointer is used to indicate a location of a first identifier in the first element, and the first identifier is one of the at least two identifiers.

The sending unit 1603 is configured to send the second packet.

The network device 1600 may alternatively be implemented by using the device shown in FIG. 20. In this case, the network device 1600 includes at least one processor, a communications bus, and at least one communications interface. Optionally, the network device 1600 may further include a memory.

In a specific embodiment, the processor in the network device 1600 is configured to:

receive a first packet through the communications interface; obtain a segment list, where the segment list corresponds to a forwarding path of the first packet, the forwarding path includes a plurality of network devices, the segment list includes a plurality of sequentially arranged identifiers, each of the plurality of identifiers corresponds to one of the plurality of network devices or one link on the forwarding path, the segment list includes a first element whose length is 128 bits, and the first element includes at least two adjacent identifiers in the plurality of identifiers; add the segment list to the first packet to generate a second packet, where the second packet includes a first pointer, a value of the first pointer is used to indicate a location of a first identifier in the first element, and the first identifier is one of the at least two identifiers; and send the second packet through the communications interface. For a detailed processing process of the processor, refer to the detailed descriptions of the processes S410, S420, and S430 and the processes S325, S330, and S335 in the foregoing embodiments. Details are not described herein again.

The communications interface in the network device 1600 is used by the network device 1600 to receive and send a packet by using a network system. For a specific process, refer to the detailed descriptions of S410, S440, S325, and S335 in the foregoing embodiments. Details are not described herein again.

The network device 1600 may alternatively be implemented by using the device shown in FIG. 21. In this case, the network device 1600 includes a main control board and one or more interface boards. The main control board and the interface boards are communicatively connected. For details, refer to the descriptions of the network device 2100 in the foregoing embodiment. The details are not described herein again.

Figure 24:
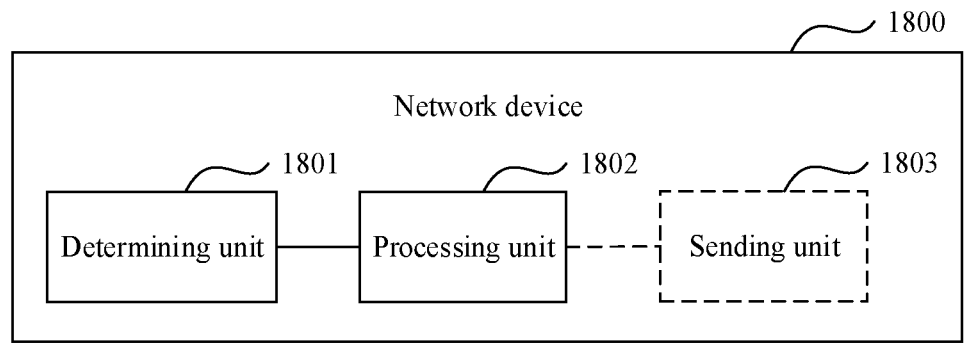
FIG. 24 is a schematic structural diagram of a network device according to an embodiment of this disclosure.

FIG. 24 is an optional schematic structural diagram of the network device 301 in the foregoing embodiments. A network device 1800 may implement a function of the network device 301 or the network device 401 in the foregoing embodiments. Referring to FIG. 24, the network device 1800 includes a determining unit 1801 and a processing unit 1802. These units may perform a corresponding function of the network device 301 or the network device 401 in the foregoing method. Details are as follows:

The determining unit 1801 is configured to determine a forwarding path of a packet, where the forwarding path includes a plurality of network devices.

The processing unit 1802 is configured to generate the segment list corresponding to the forwarding path, where the segment list includes the plurality of sequentially arranged identifiers, each of the plurality of identifiers corresponds to one of the plurality of network devices or one link on the forwarding path, the segment list includes a first element whose length is 128 bits, and the first element includes at least two adjacent identifiers in the plurality of identifiers.

Optionally, the network device 1800 further includes a sending unit 1803. The sending unit 1803 is configured to send the segment list to an ingress device on the forwarding path. Alternatively, the processing unit 1802 is further configured to encapsulate the segment list in the packet. The sending unit 1803 is configured to send the packet.

The network device 1800 may alternatively be implemented by using the device shown in FIG. 20. In this case, the network device 1800 includes at least one processor, a communications bus, and at least one communications interface. Optionally, the network device 1800 may further include a memory.

In a specific embodiment, the processor in the network device 1800 is configured to: determine a forwarding path of a packet, where the forwarding path includes a plurality of network devices; and generate the segment list corresponding to the forwarding path, where the segment list includes the plurality of sequentially arranged identifiers, each of the plurality of identifiers corresponds to one of the plurality of network devices or one link on the forwarding path, the segment list includes a first element whose length is 128 bits, and the first element includes at least two adjacent identifiers in the plurality of identifiers.

Optionally, the processor in the network device 1800 is further configured to send the segment list through the communications interface.

For a detailed processing process of the processor, refer to the detailed descriptions of the processes S310, S315, S320, and S420 in the foregoing embodiments. Details are not described herein again.

The communications interface in the network device 1800 is used by the network device 1800 to receive and send information by using a network system. For a specific process, refer to the detailed descriptions of S320 and S420 in the foregoing embodiments. Details are not described herein again.

Figure 25:
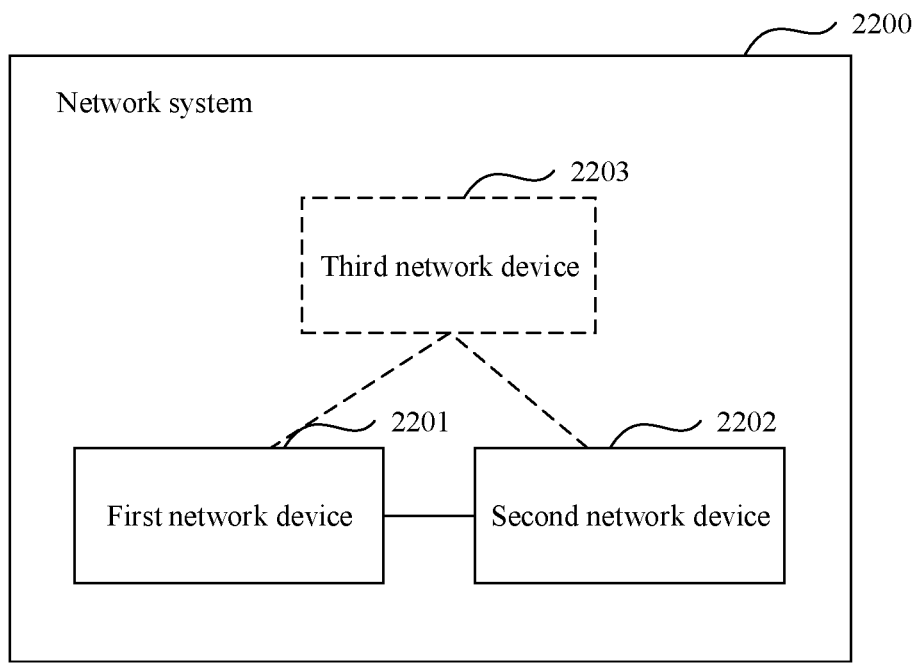
FIG. 25 is a schematic structural diagram of a network system according to an embodiment of this disclosure.

FIG. 25 is an optional schematic structural diagram of a network system according to an embodiment of the present invention. The network system 2200 includes a first network device 2201 and a second network device 2202. The first network device 2201 in the network system may perform processing steps S410, S420, S430, and S440 of the network device 401 in the embodiment shown in FIG. 18, or processing steps S325, S330, and S335 of the network device 302 in the embodiment shown in FIG. 19. The second network device 2202 in the network system may perform processing steps S450, S460, and S470 of the network device 402 in the embodiment shown in FIG. 20, or processing steps S340, S345, and S350 of the network device 303.

Optionally, the network system 2200 further includes a third network device 2203. The first network device 2203 in the network system may perform processing steps S310, S315, and S320 of the network device 301 in the embodiment shown in FIG. 19.

Correspondingly, the first network device 2201 in the network system may be the network device 1600 in the embodiment shown in FIG. 23. The second network device 2202 in the network device may be the network device 1400 in the embodiment shown in FIG. 22. The third network device 2203 in the network system may be the network device 1800 in the embodiment shown in FIG. 24.

Specifically, the third network device is configured to: determine a forwarding path of a packet, where the forwarding path includes a plurality of network devices; and generate the segment list corresponding to the forwarding path, where the segment list includes the plurality of sequentially arranged identifiers, each of the plurality of identifiers corresponds to one of the plurality of network devices or one link on the forwarding path, the segment list includes a first element whose length is 128 bits, and the first element includes at least two adjacent identifiers in the plurality of identifiers.

The second network device is configured to: receive a first packet; obtain a segment list, where the segment list corresponds to a forwarding path of the first packet, the forwarding path includes a plurality of network devices, the segment list includes a plurality of sequentially arranged identifiers, each of the plurality of identifiers corresponds to one of the plurality of network devices or one link on the forwarding path, the segment list includes a first element whose length is 128 bits, and the first element includes at least two adjacent identifiers in the plurality of identifiers; add the segment list to the first packet to generate a second packet, where the second packet includes a first pointer, a value of the first pointer is used to indicate a location of a first identifier in the first element, and the first identifier is one of the at least two identifiers; and send the second packet.

Optionally, when the network system includes the third network device, that the second network device obtains the segment list means that the second network device receives the segment list sent by the third network device. Optionally, when the network system does not include the third network device, that the second network device obtains the segment list means that the second network device generates the segment list.

The first network device is configured to: receive the second packet, where a first packet header of the second packet includes the segment list, and the second packet includes the first pointer; determine the location of the first identifier in the first element based on the value of the first pointer; copy at least one identifier starting from the first identifier to a second packet header of the second packet, to generate a third packet; and send the third packet.

An embodiment of the present invention further provides a non-transient storage medium, configured to store a software instruction used in the foregoing embodiments. The non-transient storage medium includes a program used to perform the methods shown in the foregoing embodiments. When the program is executed on a computer or a network device, the computer or the network device is enabled to perform the methods in the foregoing method embodiments.

An embodiment of the present invention further provides a computer program product including a computer program instruction. When the computer program product is run on a computer, the network node is enabled to perform the methods in the foregoing method embodiments.

"First" in the first packet, the first network device, the first identifier, the first pointer, and the quantity flag that are mentioned in the embodiments of the present invention is merely used as a name identifier, and does not represent the first in sequence. The rule is also applicable to "second", "third", "fourth", and the like. However, "$1^{st}$" in the $1^{st}$ identifier mentioned in the embodiments of the present invention represents the first in sequence. The rule is also applicable to "$N^{th}$".

In the embodiments of the present invention, it is considered that "A and/or B" includes three cases: only A, only B, and both A and B.

It should be noted that any apparatus embodiment described above is merely an example. The units described as separate parts may or may not be physically separate, and parts displayed as units may or may not be physical units, and may be located at one location, or may be distributed on a plurality of network units. Some or all the modules may be selected based on an actual requirement to achieve the objectives of the solutions of the embodiments. In addition, in accompanying drawings of embodiments of a network device or a host provided in the present invention, connection relationships between modules indicate that the modules have communication connections to each other, which may be specifically implemented as one or more communications buses or signal lines. A person of ordinary skill in the art may understand and implement the embodiments of the present invention without creative efforts.

Methods or algorithm steps described in combination with the content disclosed in the embodiments of the present invention may be implemented by hardware, or may be implemented by a processor by executing a software instruction. The software instruction may include a corresponding software module. The software module may be stored in a random access memory (random access memory, RAM), a flash memory, a read-only memory (read-only memory, ROM), an erasable programmable read-only memory (erasable programmable ROM, EPROM), an electrically erasable programmable read-only memory (Electrically EPROM, EEPROM), a hard disk, a removable hard disk, a compact disc, or any other form of storage medium well-known in the art. The storage medium is coupled to a processor, so that the processor can read information from the storage medium. Certainly, the storage medium may alternatively be a component of the processor.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, replacement, or improvement made based on the technical solutions of the present invention shall fall within the protection scope of the present invention.

What is claimed is:

1. A method for forwarding a packet, comprising:
    receiving a first packet in an Internet Protocol version 6 segment routing (SRv6) network, wherein a first packet header of the first packet comprises a segment list comprising a plurality of compressed segment identifiers, the segment list comprises a first element having a length of 128 bits, the first element comprises at least two compressed segment identifiers in the plurality of compressed segment identifiers, the first packet comprises a first pointer having a first value;
    determining, based on the first value of the first pointer, a location of a first compressed segment identifier in the first element, wherein the first compressed segment identifier is one of the at least two compressed segment identifiers in the first element;
    adding the first compressed segment identifier to a second packet header of the first packet to generate a second packet, wherein the second packet header is an Internet Protocol version 6 (IPv6) header, the second header comprises a destination address (DA) field with the first pointer;
    sending the second packet.
2. The method according to claim 1, the method further comprising:
    decrementing the first value of the first pointer by 1.

3. The method according to claim 1, wherein the first packet further comprises a second pointer having a second value, the method further comprises:
    determining a location of the first element in the segment list based on the second value of the second pointer.
4. The method according to claim 1, wherein the plurality of compressed segment identifiers are one-to-one mapped to a plurality of segment identifiers, each of the plurality of segment identifiers comprises a prefix part and a second part, and the plurality of compressed segment identifiers comprise respective second parts of the plurality of segment identifiers.
5. The method according to claim 4, wherein the DA field comprises the prefix part.
6. The method according to claim 5, the method further comprising:
    updating the prefix part in the DA field.
7. The method according to claim 1, wherein the segment list further comprises one or more uncompressed segment identifiers, each of the one or more uncompressed segment identifiers has a length of 128 bits.
8. The method according to claim 1, the method further comprising:
    adding a second compressed segment identifier to the second packet header of the first packet, wherein the second compressed segment identifier is one of the at least two compressed segment identifiers.
9. A network device comprising:
    at least one processor;
    one or more memories coupled to the at least one processor and configured to store programming instructions, that, when executed by the at least one processor, cause the network device to:
    receive a first packet in an Internet Protocol version 6 segment routing (SRv6) network, wherein a first packet header of the first packet comprises a segment list comprising a plurality of compressed segment identifiers, the segment list comprises a first element having a length of 128 bits, the first element comprises at least two compressed segment identifiers in the plurality of compressed segment identifiers, the first packet comprises a first pointer having a first value;
    determine, based on the first value of the first pointer, a location of a first compressed segment identifier in the first element, wherein the first compressed segment identifier is one of the at least two compressed segment identifiers in the first element;
    add the first compressed segment identifier to a second packet header of the first packet to generate a second packet, wherein the second packet header is an Internet Protocol version 6 (IPV6) header, the second header comprises a destination address (DA) field with the first pointer;
    send the second packet.
10. The network device according to claim 9, wherein the programming instructions, when executed by the at least one processor, further cause the network device to:
    decrement the first value of the first pointer by 1.
11. The network device according to claim 9, wherein the first packet further comprises a second pointer having a second value, and wherein the programming instructions, when executed by the at least one processor, further cause the network device to:
    determine a location of the first element in the segment list based on the second value of the second pointer.
12. The network device according to claim 9, wherein the plurality of compressed segment identifiers are one-to-one mapped to a plurality of segment identifiers, each of the plurality of segment identifiers comprises a prefix part and a second part, and the plurality of compressed segment identifiers comprise respective second parts of the plurality of segment identifiers.

13. The network device according to claim 12, wherein the DA field comprises the prefix part.

14. The network device according to claim 13, wherein the programming instructions, when executed by the at least one processor, further cause the network device to:
update the prefix part in the DA field.

15. The network device according to claim 9, wherein the segment list further comprises one or more uncompressed segment identifiers, each of the one or more uncompressed segment identifiers has a length of 128 bits.

16. The network device according to claim 9, wherein the programming instructions, when executed by the at least one processor, further cause the network device to:
add a second compressed segment identifiers to the second packet header of the first packet, wherein the second compressed segment identifier is one of the at least two compressed segment identifiers.

17. The network device according to claim 9, wherein the network device is a forwarding chip.

18. A network system comprising an ingress network device and a first network device, wherein the first network device is configured to:
receive a first packet in an Internet Protocol version 6 segment routing (SRv6) network, wherein a first packet header of the first packet comprises a segment list comprising a plurality of compressed segment identifiers, the segment list comprises a first element having a length of 128 bits, the first element comprises at least two compressed segment identifiers in the plurality of compressed segment identifiers, the first packet comprises a first pointer having a first value;
determine, based on the first value of the first pointer, a location of a first compressed segment identifier in the first element, wherein the first compressed segment identifier is one of the at least two compressed segment identifiers in the first element;
add the first compressed segment identifier to a second packet header of the first packet to generate a second packet, wherein the second packet header is an Internet Protocol version 6 (IPV6) header, the second header comprises a destination address (DA) field with the first pointer;
send the second packet.

19. The network system according to claim 18, wherein the first network device is further configured to:
decrement the first value of the first pointer by 1.

20. The network system according to claim 18, wherein the first packet further comprises a second pointer having a second value, and wherein the first network device is further configured to:
determine a location of the first element in the segment list based on the second value of the second pointer.

21. The network system according to claim 18, wherein the plurality of compressed segment identifiers are one-to-one mapped to a plurality of segment identifiers, each of the plurality of segment identifiers comprises a prefix part and a second part, and the plurality of compressed segment identifiers comprise respective second parts of the plurality of segment identifiers.

22. The network system according to claim 21, wherein the DA field comprises the prefix part.

23. The network system according to claim 22, wherein the first network device is further configured to:
update the prefix part in the DA field.

24. The network system according to claim 18, wherein the segment list further comprises one or more uncompressed segment identifiers, each of the one or more uncompressed segment identifiers has a length of 128 bits.

25. The network system according to claim 18, wherein the first network device is further configured to:
add a second compressed segment identifier to the second packet header of the first packet, wherein the second compressed segment identifier is one of the at least two compressed segment identifiers.

26. The network system according to claim 18, wherein the ingress network device is configured to:
add the segment list to the first packet header of the first packet.

27. The network system according to claim 18, wherein the ingress network device is further configured to:
add the first pointer to the second packet header of the first packet.

28. The network system according to claim 18, wherein the ingress network device is further configured to:
obtain the plurality of compressed segment identifiers based on a plurality of segment identifiers;
wherein the plurality of compressed segment identifiers are one-to-one mapped to the plurality of segment identifiers, each of the plurality of segment identifiers comprises a prefix part and a second part, and the plurality of compressed segment identifiers comprise respective second parts of the plurality of segment identifiers.

29. The network system according to claim 18, wherein the first network device is a forwarding chip.

* * * * *